United States Patent
Robertson et al.

(10) Patent No.: US 12,425,240 B2
(45) Date of Patent: Sep. 23, 2025

(54) CERTIFICATE REVOCATION LIST MANAGEMENT SERVICES

(71) Applicant: Oracle International Corporation, Redwood Shores, CA (US)

(72) Inventors: Jodi Robertson, Seattle, WA (US); Tony Long, Edmonds, WA (US); Mauruthi Geetha Mohan, Seattle, WA (US); Mina Anes, Bothell, WA (US)

(73) Assignee: Oracle International Corporation, Redwood Shores, CA (US)

( * ) Notice: Subject to any disclaimer, the term of this patent is extended or adjusted under 35 U.S.C. 154(b) by 161 days.

(21) Appl. No.: 18/466,483

(22) Filed: Sep. 13, 2023

(65) Prior Publication Data
US 2025/0088374 A1  Mar. 13, 2025

(51) Int. Cl.
*H04L 9/32* (2006.01)
*H04L 67/568* (2022.01)

(52) U.S. Cl.
CPC .......... *H04L 9/3268* (2013.01); *H04L 9/3236* (2013.01); *H04L 67/568* (2022.05)

(58) Field of Classification Search
CPC .... H04L 9/3268; H04L 9/3236; H04L 67/568
See application file for complete search history.

(56) References Cited

U.S. PATENT DOCUMENTS

| | | |
|---|---|---|
| 5,671,279 A | 9/1997 | Elgamal |
| 5,699,431 A | 12/1997 | Van Oorschot et al. |
| 7,272,714 B2 | 9/2007 | Nagaratnam et al. |
| 7,644,270 B1 | 1/2010 | Cherukumudi et al. |
| 8,176,328 B2 | 5/2012 | Chen et al. |
| 8,452,958 B2 | 5/2013 | Sun et al. |
| 9,172,543 B2 | 10/2015 | Wnuk |
| 9,197,630 B2 | 11/2015 | Sharif et al. |
| 9,231,933 B1 | 1/2016 | Shenoy et al. |
| 9,485,101 B2 | 11/2016 | Bowen |
| 9,660,978 B1 | 5/2017 | Truskovsky et al. |
| 9,680,813 B2 | 6/2017 | Sade et al. |
| 9,794,249 B1 | 10/2017 | Truskovsky et al. |
| 9,882,727 B1 | 1/2018 | Veladanda et al. |
| 10,021,084 B2 | 7/2018 | Matthews et al. |

(Continued)

FOREIGN PATENT DOCUMENTS

| | | |
|---|---|---|
| CN | 112019477 A | 12/2020 |
| CN | 114884963 A | 8/2022 |

(Continued)

OTHER PUBLICATIONS

"What is Certificate Lifecycle Management", Retrieved from https://www.encryptionconsulting.com/different-phases-of-a-certificate-lifecycle-management-process/, Aug. 1, 2024, pp. 1-12.

(Continued)

*Primary Examiner* — Clayton R Williams
(74) *Attorney, Agent, or Firm* — Invoke

(57) ABSTRACT

Operations may include receiving, from a first network entity, a first request for a first certificate revocation list (CRL) that identifies a first CRL distribution point (CDP) corresponding to the first CRL; mapping the first CDP to a first CRL identifier of a set of available CRL identifiers; locating, in a CRL repository, a first CRL based on the first CRL identifier; and transmitting the first CRL to the first network entity.

20 Claims, 7 Drawing Sheets

(56) References Cited

U.S. PATENT DOCUMENTS

| | | |
|---|---|---|
| 10,212,147 B2 | 2/2019 | Buendgen et al. |
| 10,621,577 B2 | 4/2020 | Castinado et al. |
| 10,652,030 B1 | 5/2020 | Levy et al. |
| 10,764,263 B2 | 9/2020 | Rossi |
| 10,771,261 B1 | 9/2020 | Lazar et al. |
| 10,812,276 B2 | 10/2020 | Bojjireddy et al. |
| 10,848,323 B2 | 11/2020 | Barr, III et al. |
| 11,153,103 B2 | 10/2021 | Fynaardt et al. |
| 11,196,570 B2 | 12/2021 | Borne-Pons et al. |
| 11,310,059 B2 | 4/2022 | Leibmann et al. |
| 11,362,843 B1 | 6/2022 | Jiang et al. |
| 11,368,314 B2 | 6/2022 | Ray et al. |
| 11,388,594 B2 | 7/2022 | Uy et al. |
| 11,438,325 B2 | 9/2022 | Begun et al. |
| 11,627,123 B2 | 4/2023 | Stayskal et al. |
| 11,706,038 B1 | 7/2023 | Thakore et al. |
| 11,888,997 B1* | 1/2024 | Bowen .................. H04L 9/3247 |
| 12,088,738 B2 | 9/2024 | Rosenthol et al. |
| 2002/0007346 A1 | 1/2002 | Qiu et al. |
| 2002/0174066 A1 | 11/2002 | Kleckner et al. |
| 2003/0037234 A1 | 2/2003 | Fu et al. |
| 2006/0047965 A1 | 3/2006 | Thayer |
| 2006/0101510 A1 | 5/2006 | Kadyk et al. |
| 2007/0005956 A1 | 1/2007 | Zilinskas et al. |
| 2007/0016782 A1 | 1/2007 | Crall et al. |
| 2007/0147619 A1 | 6/2007 | Bellows et al. |
| 2010/0030897 A1 | 2/2010 | Stradling |
| 2010/0325429 A1 | 12/2010 | Saha et al. |
| 2011/0113239 A1 | 5/2011 | Fu et al. |
| 2012/0036220 A1 | 2/2012 | Dare et al. |
| 2012/0240192 A1 | 9/2012 | Orazi et al. |
| 2012/0246466 A1 | 9/2012 | Salvarani et al. |
| 2012/0278614 A1 | 11/2012 | Choi |
| 2013/0086642 A1 | 4/2013 | Resch et al. |
| 2014/0298419 A1 | 10/2014 | Boubez et al. |
| 2015/0135299 A1 | 5/2015 | Liang et al. |
| 2015/0215308 A1 | 7/2015 | Manolov et al. |
| 2015/0279132 A1 | 10/2015 | Perotti |
| 2016/0277923 A1 | 9/2016 | Steffey et al. |
| 2017/0039373 A1 | 2/2017 | Sasin et al. |
| 2017/0126667 A1 | 5/2017 | Bishop et al. |
| 2017/0171191 A1 | 6/2017 | Cignetti et al. |
| 2017/0279807 A1 | 9/2017 | Bermudez |
| 2017/0317837 A1 | 11/2017 | Alrawais et al. |
| 2017/0338967 A1 | 11/2017 | Lewison et al. |
| 2018/0083966 A1 | 3/2018 | Zhou et al. |
| 2018/0102904 A1* | 4/2018 | Lin ...................... G06F 9/45558 |
| 2018/0287804 A1 | 10/2018 | Geisbush |
| 2019/0026804 A1 | 1/2019 | Yin |
| 2019/0149342 A1 | 5/2019 | Fynaardt et al. |
| 2019/0165950 A1 | 5/2019 | Ibrahim |
| 2019/0166635 A1 | 5/2019 | McColgan et al. |
| 2019/0347406 A1 | 11/2019 | Lev-Ran |
| 2019/0349402 A1 | 11/2019 | Shukla et al. |
| 2019/0356817 A1 | 11/2019 | Bush et al. |
| 2019/0363895 A1* | 11/2019 | Barr, III ................ H04L 67/568 |
| 2019/0372783 A1 | 12/2019 | Martinez et al. |
| 2020/0021575 A1 | 1/2020 | Rezvani et al. |
| 2020/0092095 A1 | 3/2020 | Yang et al. |
| 2020/0150972 A1 | 5/2020 | Ketkar et al. |
| 2020/0274718 A1 | 8/2020 | Hwang et al. |
| 2020/0274862 A1 | 8/2020 | Varvarezis et al. |
| 2020/0396089 A1 | 12/2020 | Guo et al. |
| 2021/0034767 A1 | 2/2021 | Free et al. |
| 2021/0126801 A1 | 4/2021 | Nix |
| 2021/0152547 A1 | 5/2021 | Barhudarian et al. |
| 2021/0211307 A1 | 7/2021 | Statia et al. |
| 2021/0218723 A1 | 7/2021 | Lekov et al. |
| 2021/0392002 A1 | 12/2021 | Gray et al. |
| 2021/0409403 A1 | 12/2021 | Lewin et al. |
| 2021/0409409 A1 | 12/2021 | Palanisamy |
| 2022/0014522 A1 | 1/2022 | Thomas et al. |
| 2022/0038894 A1 | 2/2022 | Yoon et al. |
| 2022/0123951 A1* | 4/2022 | Lutz ...................... H04L 9/3268 |
| 2022/0150238 A1 | 5/2022 | Bhalerao |
| 2022/0239503 A1 | 7/2022 | Mallikarjuna et al. |
| 2022/0393886 A1 | 12/2022 | Williams et al. |
| 2023/0007474 A1 | 1/2023 | Ni et al. |
| 2023/0032867 A1 | 2/2023 | Peddada et al. |
| 2023/0062888 A1 | 3/2023 | Colombano |
| 2023/0109231 A1 | 4/2023 | Adogla et al. |
| 2023/0121514 A1 | 4/2023 | Smith |
| 2023/0208655 A1 | 6/2023 | Statia et al. |
| 2023/0237155 A1 | 7/2023 | Jacquin et al. |
| 2023/0291574 A1 | 9/2023 | Held et al. |
| 2023/0291577 A1 | 9/2023 | Thai et al. |
| 2023/0401307 A1 | 12/2023 | Pop et al. |
| 2023/0412397 A1 | 12/2023 | Gollent et al. |
| 2024/0015508 A1 | 1/2024 | Yoon et al. |
| 2024/0020373 A1 | 1/2024 | Ivanov et al. |
| 2024/0031146 A1 | 1/2024 | Marosi-Bauer et al. |
| 2024/0106886 A1 | 3/2024 | Roy et al. |
| 2024/0121603 A1 | 4/2024 | Yoon et al. |
| 2024/0146543 A1 | 5/2024 | Sahoo et al. |
| 2024/0333640 A1 | 10/2024 | Shevade et al. |
| 2024/0356763 A1 | 10/2024 | Goldberg et al. |
| 2024/0388510 A1 | 11/2024 | Madtha et al. |
| 2025/0030561 A1 | 1/2025 | Long et al. |
| 2025/0088373 A1 | 3/2025 | Uzun et al. |
| 2025/0097211 A1 | 3/2025 | Uzun et al. |
| 2025/0133401 A1 | 4/2025 | Lee et al. |

FOREIGN PATENT DOCUMENTS

| | | |
|---|---|---|
| EP | 1251670 A2 | 10/2002 |
| EP | 2267970 A2 | 12/2010 |
| EP | 2854349 A1 | 4/2015 |
| EP | 3772208 B1 | 9/2024 |
| KR | 10-2011-0045459 A | 5/2011 |
| WO | 2006/122024 A2 | 11/2006 |
| WO | 2022/121461 A1 | 6/2022 |
| WO | 2022/133026 A1 | 6/2022 |
| WO | 2023/240360 A1 | 12/2023 |
| WO | 2025/059187 A1 | 3/2025 |

OTHER PUBLICATIONS

"About Azure Key Vault certificates", Retrieved from https://learn.microsoft.com/en-us/azure/key-vault/certificates/about-certificates, Feb. 8, 2023, pp. 1-8.

"About the Expressway", Aug. 17, 2022. pp. 1-12.

"Automated certificate management for TLS certificates", Retrieved from https://docs.servicenow.com/en-US/bundle/utah-it-operations-management/page/product/discovery/concept/automated-cert-requests.html, Retrieved on May 4, 2023, pp. 1-4.

"AWS Certificate Manager FAQs", Retrieved from https://aws.amazon.com/certificate-manager/faqs/, Retrieved on Mar. 24, 2023, pp. 1-17.

"Azure Instance Metadata Service", Retrieved from https://learn.microsoft.com/en-us/azure/virtual-machines/instance-metadata-service?tabs=windows, Mar. 15, 2023, pp. 1-42.

"Cisco Expressway Certificate Creation and Use Deployment Guide", Feb. 23, 2021, pp. 10.

"Deploying the CA bundle iApp", Retrieved from https://www.f5.com/pdf/deployment-guides/f5-ca-bundle-dg.pdf, Dec. 14, 2017, pp. 1-9.

"DigiCert Public Key Infrastructure (PKI) Platform", 2019, pp. 15.

"Get started with Key Vault certificates", Retrieved from https://learn.microsoft.com/en-us/azure/key-vault/certificates/certificate-scenarios, Retrieved on Feb. 1, 2023, pp. 1-6.

"High Availability using Patching and Rolling AP Upgrade on Cisco Catalyst 9800 Wireless Controllers", Copyright 2020, pp. 1-41.

"Manage Certificate Revocation Lists (CRLs)", Jul. 23, 2021, pp. 1-4.

"PKI secrets engine", Retrieved from https://developer.hashicorp.com/vault/docs/secrets/pki, Retrieved on May 4, 2023, pp. 1-3.

"Planning a certificate revocation list (CRL)", Retrieved from https://docs.aws.amazon.com/privateca/latest/userguide/crl-planning.html, Retrieved on Jul. 28, 2023, pp. 11.

(56) References Cited

OTHER PUBLICATIONS

"Release app updates with staged rollouts", Retrieved from https://support.google.com/googleplay/android-developer/answer/6346149?hl=en#zippy=%2Crelease-a-staged-rollout-to-specific-countries, Retrieved on Apr. 27, 2023, pp. 1-2.
"Release Your App Update in a Staged Rollout", Retrieved from https://developer.amazon.com/docs/app-submission/release-updates-in-staged-rollouts.html, Retrieved on Apr. 27, 2023, pp. 1-18.
"Rotate Security Certificates", Retrieved from https://www.cockroachlabs.com/docs/stable/rotate-certificates, Retrieved on May 4, 2023, pp. 1-6.
"Rotating the Root CA and Leaf Certificates", Retrieved from https://docs.pivotal.io/ops-manager/2-4/security/pcf-infrastructure/rotate-cas-and-leaf-certs.html, Nov. 5, 2020, pp. 1-9.
"Staged upgrade", Retrieved from https://www.ibm.com/docs/en/order-management-sw/9.4.0?topic=migrating-staged-upgrade, Mar. 2, 2021, pp. 1-3.
"Troubleshoot SSL certificates", Retrieved from https://cloud.google.com/load-balancing/docs/ssl-certificates/troubleshooting, Retrieved on Mar. 24, 2023, pp. 1-8.
"Tutorial: Configure certificate auto-rotation in Key Vault", Retrieved from https://learn.microsoft.com/en-us/azure/key-vault/certificates/tutorial-rotate-certificates, Feb. 27, 2023, pp. 1-6.
"Updating the CA bundle", Retrieved from https://docs.openshift.com/container-platform/4.9/security/certificates/updating-ca-bundle.html#ca-bundle-understanding_updating-ca-bundle, Retrieved on Mar. 24, 2023, pp. 1-2.
"Updating your private CA", Retrieved from https://docs.aws.amazon.com/privateca/latest/userguide/PCAUpdateCA.html, Retrieved on Mar. 24, 2023, pp. 1-4.
"Use self-managed SSL certificates", Retrieved from https://cloud.google.com/load-balancing/docs/ssl-certificates/self-managed-certs, Aug. 15, 2023, p. 13.
"vSphere Security", vmware, Update 3, Mar. 21, 2023, pp. 1-426.
"Working with Hosts", Retrieved from https://docs.cloudstack.apache.org/projects/archived-cloudstack-administration/en/latest/hosts.html, Retrieved on Mar. 24, 2023, pp. 1-7.
Atutxa et al., "Improving efficiency and security of IIoT communications using in-network validation of server certificate", Computers in Industry, vol. 144, Jan. 2023, 103802, pp. 30.
Bigelow S.J., "Rolling deployment", Retrieved from https://www.techtarget.com/searchitoperations/definition/rolling-deployment, Jan. 2023, pp. 4.
Este-Gracias S., "Rotate your CA seamlessly using a Vault PKI", Retrieved from https://sestegra.medium.com/rotate-your-ca-seamlessly-using-a-vault-pki-9262228b4afb Sep. 29, 2022, pp. 1-49.
Ghanmi et al., "A Secure Data Storage in Multi-cloud Architecture Using Blowfish Encryption Algorithm", Advanced Information Networking and Applications, Mar. 2022, pp. 398-408.
Jamal F., "Zero Trust for SSH—Secure One-click Server Access for Software Engineering Teams", Retrieved from https://www.banyansecurity.io/blog/zero-trust-for-ssh/, Oct. 28, 2020, pp. 1-7.
Manjusha R et al., "Secure Authentication and Access System for Cloud Computing Auditing Services Using Associated Digital Certificate", Indian Journal of Science and Technology, vol. 8 (S7), Apr. 2015, pp. 220-227.
Nexthop Team, "Updated: Creating a Certificate Revocation List Distribution Point for Your Internal Certification Authority", Retrieved from https://techcommunity.microsoft.com/t5/skype-for-business-blog/updated-creating-a-certificate-revocation-list-distribution/ba-p/620691, Dec. 17, 2012, pp. 10.
Rowley J., "Google's Moving Forward Together Proposals for Root CA Policy: Rotating ICAS More Frequently", Retrieved from https://www.digicert.com/blog/googles-moving-forward-together-proposals-for-root-ca-policy, Mar. 22, 2023, pp. 1-11.
Subhayu, "Different Phases of a Certificate Lifecycle Management Process for a secure WPA2-Enterprise network", Certificate Lifecycle Management Oct. 6, 2022, pp. 16.
Ylonen et al., "Security of Automated Access Management Using Secure Shell (SSH)", NISTIR 7966 (Draft), Aug. 2014, pp. 43.

\* cited by examiner

CERTIFICATE REVOCATION LIST MANAGEMENT SERVICES

TECHNICAL FIELD

The present disclosure relates to digital certificates used by network entities to authenticate other network entities. In particular, the present disclosure relates to certificate revocation lists utilized to determine whether a digital certificate has been revoked.

BACKGROUND

A computing network, such as a virtual cloud network, may include network entities that communicate with one another. Communications between network entities may be performed in accordance with a security protocol whereby network entities authenticate one another by presenting a digital certificate. When a network entity presents a valid digital certificate to another network entity, the other network entity can trust that it is communicating with the network entity, as opposed to some unknown entity, based on a trust relationship with the certificate authority (CA) that issued the digital certificate.

A certificate revocation lists (CRL) may be used to identify digital certificates issued by a CA that the CA has subsequently revoked. When authenticating a digital certificate, the network entity may check a CRL to confirm whether the digital certificate is listed on the CRL. If the digital certificate is listed on the CRL, the security protocol may preclude the network entity from authenticating another network entity on the basis of the digital certificate.

The content of this background section should not be construed as prior art merely by virtue of its presence in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
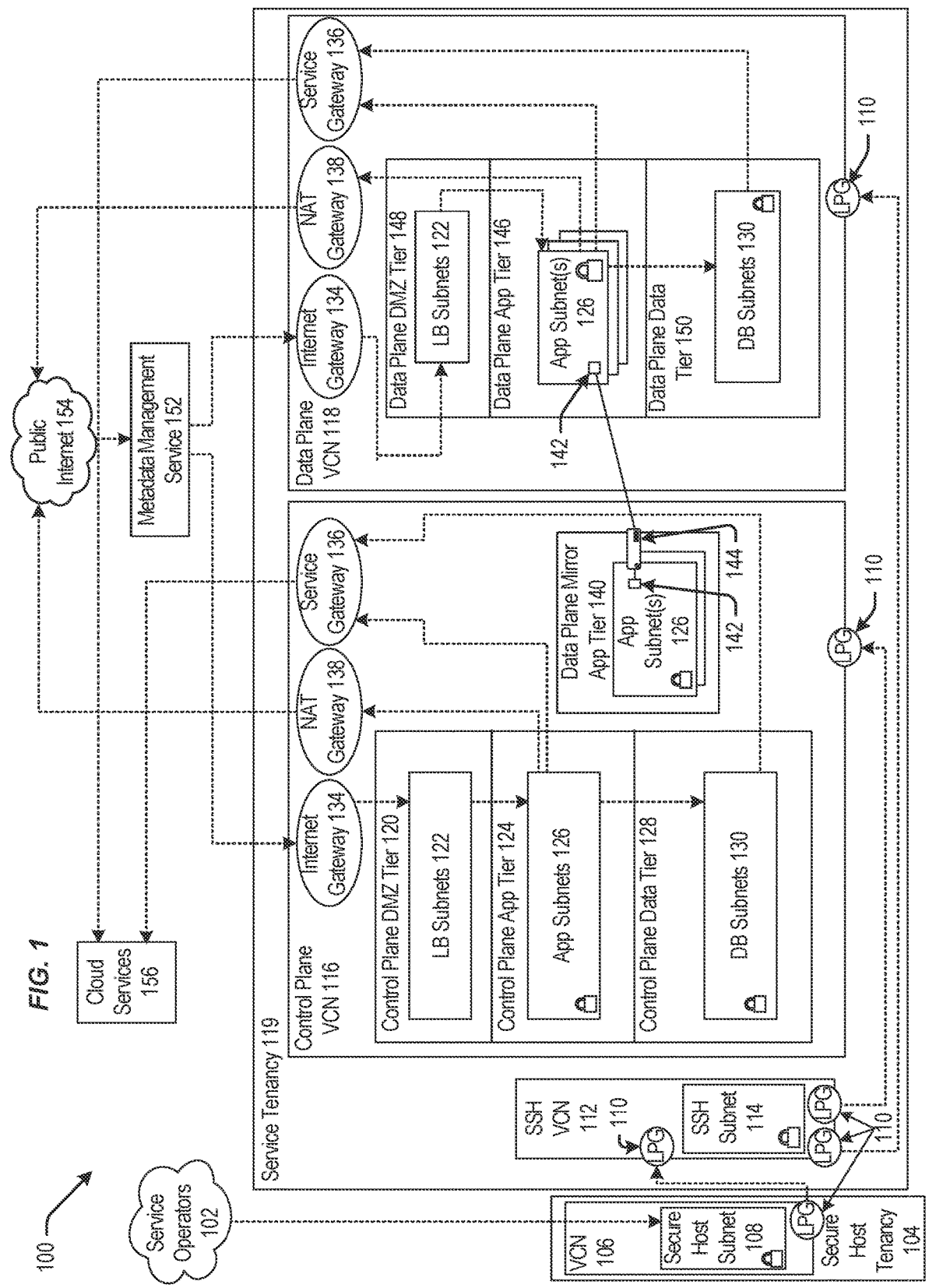
FIGS. 1-4 are block diagrams illustrating patterns for implementing a cloud infrastructure as a service system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention. Asymmetric 1. GENERAL OVERVIEW
2. CLOUD COMPUTING TECHNOLOGY
3. COMPUTER SYSTEM
4. CERTIFICATE REVOCATION LIST MANAGEMENT ARCHITECTURE
5. SERVING CERTIFICATE REVOCATION LISTS
6. MISCELLANEOUS; EXTENSIONS

1. General Overview

One or more embodiments may include identifying and serving CRLs from a CRL repository to a set of network entities based on a mapping of available CRL identifiers to a corresponding CRL distribution point (CDP) identified in a CRL request from a respective network entity. A system may receive a request for a CRL from a network entity that identifies a CDP corresponding to the CRL. The system may map the CDP to a CRL identifier from among a set of available CRL identifiers and, based on the CRL identifier, the system may locate the CRL in a CRL repository and transmit the CRL to the network entity.

A system may identify and serve CRLs to multiple network entities associated with a computer network, such as a virtual cloud network. By serving CRLs to the network entities, the network entities are relieved from having to perform operations associated with maintaining and updating CRLs. When network entities maintain and update CRLs, the network entity may periodically check CDPs for updated CRLs. If a network entity utilizes an outdated CRL, the network entity may authenticate another network entity based on a digital certificate that has been revoked. The system may prevent network entities from relying on an outdated CRL by identifying and serving the current CRLs to the network entities in response to CRL requests, thereby improving compliance with security protocols for authenticating network entities.

One or more embodiments described in this Specification and/or recited in the claims may not be included in this General Overview section.

2. Cloud Computing Technology

Infrastructure as a Service (IaaS) is an application of cloud computing technology. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (example services include billing software, monitoring software, logging software, load balancing software, clustering software, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In some cases, a cloud computing model will involve the participation of a cloud provider. The cloud provider may, but need not be, a third-party service that specializes in providing (e.g., offering, renting, selling) IaaS. An entity may also opt to deploy a private cloud, becoming its own provider of infrastructure services.

In some examples, IaaS deployment is the process of implementing a new application, or a new version of an application, onto a prepared application server or other similar device. IaaS deployment may also include the process of preparing the server (e.g., installing libraries, daemons, etc.). The deployment process is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are challenges for IaaS provisioning. There is an initial challenge of provisioning the initial set of infrastructure. There is an additional challenge of evolving the existing infrastructure (e.g., adding new services, changing services, removing services, etc.) after the initial provisioning is completed. In some cases, these challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). In some embodiments, infrastructure and resources may be provisioned (manually, and/or using a provisioning tool) prior to deployment of code to be executed on the infrastructure. However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

FIG. 1 is a block diagram illustrating an example pattern of an IaaS architecture 100, according to at least one embodiment. Service operators 102 can be communicatively coupled to a secure host tenancy 104 that can include a virtual cloud network (VCN) 106 and a secure host subnet 108. In some examples, the service operators 102 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 106 and/or the Internet.

The VCN 106 can include a local peering gateway (LPG) 110 that can be communicatively coupled to a secure shell (SSH) VCN 112 via an LPG 110 contained in the SSH VCN 112. The SSH VCN 112 can include an SSH subnet 114, and the SSH VCN 112 can be communicatively coupled to a control plane VCN 116 via the LPG 110 contained in the control plane VCN 116. Also, the SSH VCN 112 can be communicatively coupled to a data plane VCN 118 via an LPG 110. The control plane VCN 116 and the data plane VCN 118 can be contained in a service tenancy 119 that can be owned and/or operated by the IaaS provider.

The control plane VCN 116 can include a control plane demilitarized zone (DMZ) tier 120 that acts as a perimeter network (e.g., portions of a corporate network between the corporate intranet and external networks). The DMZ-based servers may have restricted responsibilities and help keep breaches contained. Additionally, the DMZ tier 120 can include one or more load balancer (LB) subnet(s) 122, a control plane app tier 124 that can include app subnet(s) 126, a control plane data tier 128 that can include database (DB) subnet(s) 130 (e.g., frontend DB subnet(s) and/or backend DB subnet(s)). The LB subnet(s) 122 contained in the control plane DMZ tier 120 can be communicatively coupled to the app subnet(s) 126 contained in the control plane app tier 124 and an Internet gateway 134 that can be contained in the control plane VCN 116, and the app subnet(s) 126 can be communicatively coupled to the DB subnet(s) 130 contained in the control plane data tier 128 and a service gateway 136 and a network address translation (NAT) gateway 138. The control plane VCN 116 can include the service gateway 136 and the NAT gateway 138.

The control plane VCN 116 can include a data plane mirror app tier 140 that can include app subnet(s) 126. The app subnet(s) 126 contained in the data plane mirror app tier 140 can include a virtual network interface controller (VNIC) 142 that can execute a compute instance 144. The compute instance 144 can communicatively couple the app subnet(s) 126 of the data plane mirror app tier 140 to app subnet(s) 126 that can be contained in a data plane app tier 146.

The data plane VCN 118 can include the data plane app tier 146, a data plane DMZ tier 148, and a data plane data tier 150. The data plane DMZ tier 148 can include LB subnet(s) 122 that can be communicatively coupled to the app subnet(s) 126 of the data plane app tier 146 and the Internet gateway 134 of the data plane VCN 118. The app subnet(s) 126 can be communicatively coupled to the service gateway 136 of the data plane VCN 118 and the NAT gateway 138 of the data plane VCN 118. The data plane data tier 150 can also include the DB subnet(s) 130 that can be communicatively coupled to the app subnet(s) 126 of the data plane app tier 146.

The Internet gateway 134 of the control plane VCN 116 and of the data plane VCN 118 can be communicatively coupled to a metadata management service 152 that can be communicatively coupled to public Internet 154. Public Internet 154 can be communicatively coupled to the NAT gateway 138 of the control plane VCN 116 and of the data plane VCN 118. The service gateway 136 of the control plane VCN 116 and of the data plane VCN 118 can be communicatively couple to cloud services 156.

In some examples, the service gateway 136 of the control plane VCN 116 or of the data plane VCN 118 can make application programming interface (API) calls to cloud services 156 without going through public Internet 154. The API calls to cloud services 156 from the service gateway 136 can be one-way: the service gateway 136 can make API calls to cloud services 156, and cloud services 156 can send requested data to the service gateway 136. But, cloud services 156 may not initiate API calls to the service gateway 136.

In some examples, the secure host tenancy 104 can be directly connected to the service tenancy 119, which may be otherwise isolated. The secure host subnet 108 can communicate with the SSH subnet 114 through an LPG 110 that may enable two-way communication over an otherwise isolated system. Connecting the secure host subnet 108 to the SSH subnet 114 may give the secure host subnet 108 access to other entities within the service tenancy 119.

The control plane VCN 116 may allow users of the service tenancy 119 to set up or otherwise provision desired resources. Desired resources provisioned in the control plane VCN 116 may be deployed or otherwise used in the data plane VCN 118. In some examples, the control plane VCN 116 can be isolated from the data plane VCN 118, and the data plane mirror app tier 140 of the control plane VCN 116 can communicate with the data plane app tier 146 of the data plane VCN 118 via VNICs 142 that can be contained in the data plane mirror app tier 140 and the data plane app tier 146.

In some examples, users of the system, or customers, can make requests, for example create, read, update, or delete (CRUD) operations, through public Internet 154 that can communicate the requests to the metadata management service 152. The metadata management service 152 can communicate the request to the control plane VCN 116 through the Internet gateway 134. The request can be received by the LB subnet(s) 122 contained in the control plane DMZ tier 120. The LB subnet(s) 122 may determine that the request is valid, and in response to this determination, the LB subnet(s) 122 can transmit the request to app subnet(s) 126 contained in the control plane app tier 124. If the request is validated and requires a call to public Internet 154, the call to public Internet 154 may be transmitted to the NAT gateway 138 that can make the call to public Internet 154. Metadata that may be desired to be stored by the request can be stored in the DB subnet(s) 130.

In some examples, the data plane mirror app tier 140 can facilitate direct communication between the control plane VCN 116 and the data plane VCN 118. For example, changes, updates, or other suitable modifications to configuration may be desired to be applied to the resources contained in the data plane VCN 118. Via a VNIC 142, the control plane VCN 116 can directly communicate with, and can thereby execute the changes, updates, or other suitable modifications to configuration to, resources contained in the data plane VCN 118.

In some embodiments, the control plane VCN 116 and the data plane VCN 118 can be contained in the service tenancy 119. In this case, the user, or the customer, of the system may not own or operate either the control plane VCN 116 or the data plane VCN 118. Instead, the IaaS provider may own or operate the control plane VCN 116 and the data plane VCN 118, both of which may be contained in the service tenancy 119. This embodiment can enable isolation of networks that may prevent users or customers from interacting with other users', or other customers', resources. Also, this embodiment may allow users or customers of the system to store databases privately without needing to rely on public Internet 154, which may not have a desired level of threat prevention, for storage.

In other embodiments, the LB subnet(s) 122 contained in the control plane VCN 116 can be configured to receive a signal from the service gateway 136. In this embodiment, the control plane VCN 116 and the data plane VCN 118 may be configured to be called by a customer of the IaaS provider without calling public Internet 154. Customers of the IaaS provider may desire this embodiment since database(s) that the customers use may be controlled by the IaaS provider and may be stored on the service tenancy 119, which may be isolated from public Internet 154.

Figure 2:
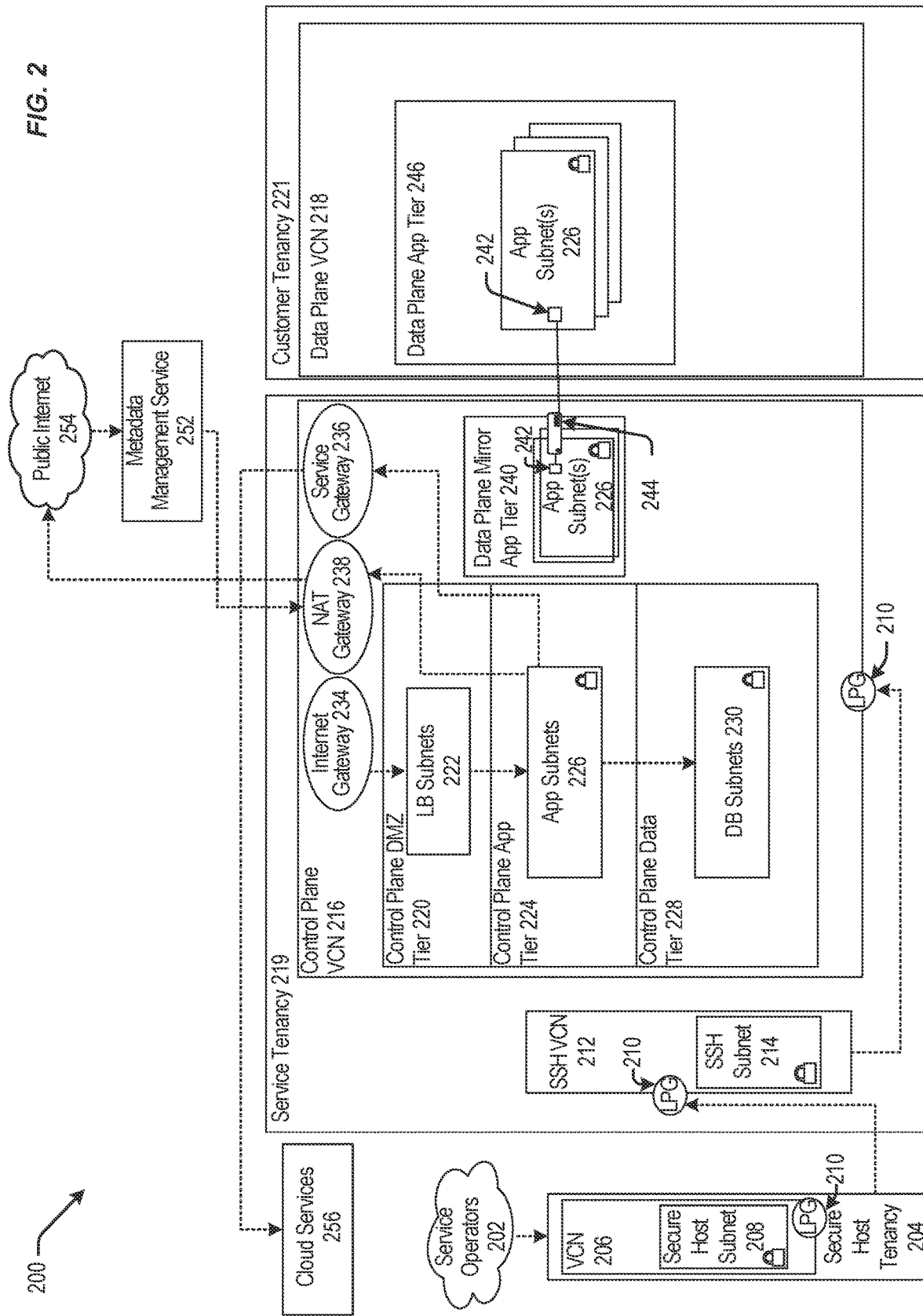

FIG. 2 is a block diagram illustrating another example pattern of an IaaS architecture 200, according to at least one embodiment. Service operators 202 (e.g., service operators 102 of FIG. 1) can be communicatively coupled to a secure host tenancy 204 (e.g., the secure host tenancy 104 of FIG. 1) that can include a virtual cloud network (VCN) 206 (e.g., the VCN 106 of FIG. 1) and a secure host subnet 208 (e.g., the secure host subnet 108 of FIG. 1). The VCN 206 can include a local peering gateway (LPG) 210 (e.g., the LPG 110 of FIG. 1) that can be communicatively coupled to a secure shell (SSH) VCN 212 (e.g., the SSH VCN 112 of FIG. 1) via an LPG 110 contained in the SSH VCN 212. The SSH VCN 212 can include an SSH subnet 214 (e.g., the SSH subnet 114 of FIG. 1), and the SSH VCN 212 can be communicatively coupled to a control plane VCN 216 (e.g., the control plane VCN 116 of FIG. 1) via an LPG 210 contained in the control plane VCN 216. The control plane VCN 216 can be contained in a service tenancy 219 (e.g., the service tenancy 119 of FIG. 1), and the data plane VCN 218 (e.g., the data plane VCN 118 of FIG. 1) can be contained in a customer tenancy 221 that may be owned or operated by users, or customers, of the system.

The control plane VCN 216 can include a control plane DMZ tier 220 (e.g., the control plane DMZ tier 120 of FIG.

1) that can include LB subnet(s) 222 (e.g., LB subnet(s) 122 of FIG. 1), a control plane app tier 224 (e.g., the control plane app tier 124 of FIG. 1) that can include app subnet(s) 226 (e.g., app subnet(s) 126 of FIG. 1), a control plane data tier 228 (e.g., the control plane data tier 128 of FIG. 1) that can include database (DB) subnet(s) 230 (e.g., similar to DB subnet(s) 130 of FIG. 1). The LB subnet(s) 222 contained in the control plane DMZ tier 220 can be communicatively coupled to the app subnet(s) 226 contained in the control plane app tier 224 and an Internet gateway 234 (e.g., the Internet gateway 134 of FIG. 1) that can be contained in the control plane VCN 216, and the app subnet(s) 226 can be communicatively coupled to the DB subnet(s) 230 contained in the control plane data tier 228 and a service gateway 236 (e.g., the service gateway 136 of FIG. 1) and a network address translation (NAT) gateway 238 (e.g., the NAT gateway 138 of FIG. 1). The control plane VCN 216 can include the service gateway 236 and the NAT gateway 238.

The control plane VCN 216 can include a data plane mirror app tier 240 (e.g., the data plane mirror app tier 140 of FIG. 1) that can include app subnet(s) 226. The app subnet(s) 226 contained in the data plane mirror app tier 240 can include a virtual network interface controller (VNIC) 242 (e.g., the VNIC of 142) that can execute a compute instance 244 (e.g., similar to the compute instance 144 of FIG. 1). The compute instance 244 can facilitate communication between the app subnet(s) 226 of the data plane mirror app tier 240 and the app subnet(s) 226 that can be contained in a data plane app tier 246 (e.g., the data plane app tier 146 of FIG. 1) via the VNIC 242 contained in the data plane mirror app tier 240 and the VNIC 242 contained in the data plane app tier 246.

The Internet gateway 234 contained in the control plane VCN 216 can be communicatively coupled to a metadata management service 252 (e.g., the metadata management service 152 of FIG. 1) that can be communicatively coupled to public Internet 254 (e.g., public Internet 154 of FIG. 1). Public Internet 254 can be communicatively coupled to the NAT gateway 238 contained in the control plane VCN 216. The service gateway 236 contained in the control plane VCN 216 can be communicatively couple to cloud services 256 (e.g., cloud services 156 of FIG. 1).

In some examples, the data plane VCN 218 can be contained in the customer tenancy 221. In this case, the IaaS provider may provide the control plane VCN 216 for each customer, and the IaaS provider may, for each customer, set up a unique, compute instance 244 that is contained in the service tenancy 219. Each compute instance 244 may allow communication between the control plane VCN 216, contained in the service tenancy 219, and the data plane VCN 218 that is contained in the customer tenancy 221. The compute instance 244 may allow resources, that are provisioned in the control plane VCN 216 that is contained in the service tenancy 219, to be deployed or otherwise used in the data plane VCN 218 that is contained in the customer tenancy 221.

In other examples, the customer of the IaaS provider may have databases that live in the customer tenancy 221. In this example, the control plane VCN 216 can include the data plane mirror app tier 240 that can include app subnet(s) 226. The data plane mirror app tier 240 can reside in the data plane VCN 218, but the data plane mirror app tier 240 may not live in the data plane VCN 218. That is, the data plane mirror app tier 240 may have access to the customer tenancy 221, but the data plane mirror app tier 240 may not exist in the data plane VCN 218 or be owned or operated by the customer of the IaaS provider. The data plane mirror app tier 240 may be configured to make calls to the data plane VCN 218 but may not be configured to make calls to any entity contained in the control plane VCN 216. The customer may desire to deploy or otherwise use resources in the data plane VCN 218 that are provisioned in the control plane VCN 216, and the data plane mirror app tier 240 can facilitate the desired deployment, or other usage of resources, of the customer.

In some embodiments, the customer of the IaaS provider can apply filters to the data plane VCN 218. In this embodiment, the customer can determine what the data plane VCN 218 can access, and the customer may restrict access to public Internet 254 from the data plane VCN 218. The IaaS provider may not be able to apply filters or otherwise control access of the data plane VCN 218 to any outside networks or databases. Applying filters and controls by the customer onto the data plane VCN 218, contained in the customer tenancy 221, can help isolate the data plane VCN 218 from other customers and from public Internet 254.

In some embodiments, cloud services 256 can be called by the service gateway 236 to access services that may not exist on public Internet 254, on the control plane VCN 216, or on the data plane VCN 218. The connection between cloud services 256 and the control plane VCN 216 or the data plane VCN 218 may not be live or continuous. Cloud services 256 may exist on a different network owned or operated by the IaaS provider. Cloud services 256 may be configured to receive calls from the service gateway 236 and may be configured to not receive calls from public Internet 254. Some cloud services 256 may be isolated from other cloud services 256, and the control plane VCN 216 may be isolated from cloud services 256 that may not be in the same region as the control plane VCN 216. For example, the control plane VCN 216 may be located in "Region 1," and cloud service "Deployment 1," may be located in Region 1 and in "Region 2." If a call to Deployment 1 is made by the service gateway 236 contained in the control plane VCN 216 located in Region 1, the call may be transmitted to Deployment 1 in Region 1. In this example, the control plane VCN 216, or Deployment 1 in Region 1, may not be communicatively coupled to, or otherwise in communication with, Deployment 1 in Region 2.

Figure 3:
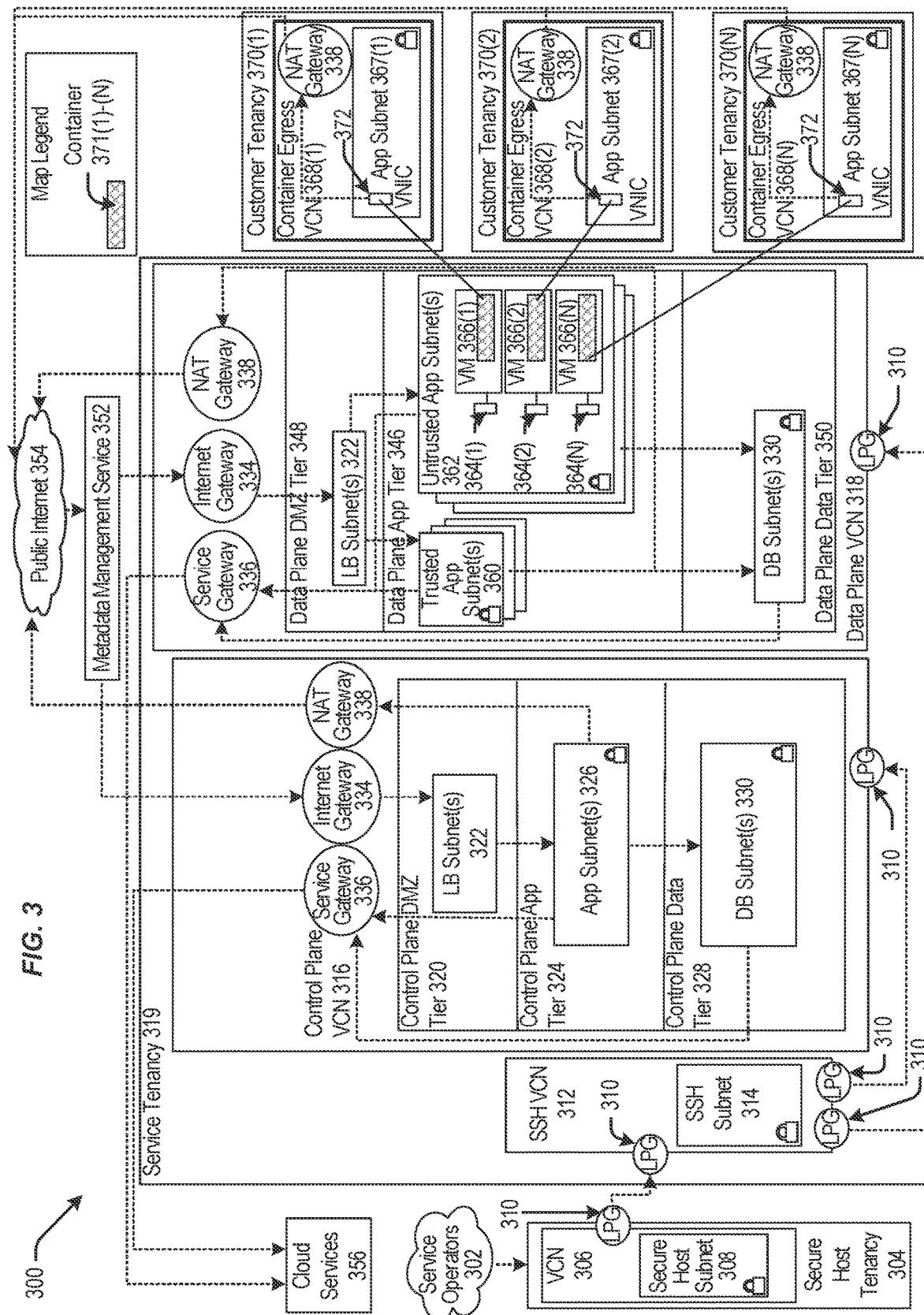

FIG. 3 is a block diagram illustrating another example pattern of an IaaS architecture 300, according to at least one embodiment. Service operators 302 (e.g., service operators 102 of FIG. 1) can be communicatively coupled to a secure host tenancy 304 (e.g., the secure host tenancy 104 of FIG. 1) that can include a virtual cloud network (VCN) 306 (e.g., the VCN 106 of FIG. 1) and a secure host subnet 308 (e.g., the secure host subnet 108 of FIG. 1). The VCN 306 can include an LPG 310 (e.g., the LPG 110 of FIG. 1) that can be communicatively coupled to an SSH VCN 312 (e.g., the SSH VCN 112 of FIG. 1) via an LPG 310 contained in the SSH VCN 312. The SSH VCN 312 can include an SSH subnet 314 (e.g., the SSH subnet 114 of FIG. 1), and the SSH VCN 312 can be communicatively coupled to a control plane VCN 316 (e.g., the control plane VCN 116 of FIG. 1) via an LPG 310 contained in the control plane VCN 316 and to a data plane VCN 318 (e.g., the data plane VCN 118 of FIG. 1) via an LPG 310 contained in the data plane VCN 318. The control plane VCN 316 and the data plane VCN 318 can be contained in a service tenancy 319 (e.g., the service tenancy 119 of FIG. 1).

The control plane VCN 316 can include a control plane DMZ tier 320 (e.g., the control plane DMZ tier 120 of FIG. 1) that can include load balancer (LB) subnet(s) 322 (e.g., LB subnet(s) 122 of FIG. 1), a control plane app tier 324

(e.g., the control plane app tier 124 of FIG. 1) that can include app subnet(s) 326 (e.g., similar to app subnet(s) 126 of FIG. 1), a control plane data tier 328 (e.g., the control plane data tier 128 of FIG. 1) that can include DB subnet(s) 330. The LB subnet(s) 322 contained in the control plane DMZ tier 320 can be communicatively coupled to the app subnet(s) 326 contained in the control plane app tier 324 and to an Internet gateway 334 (e.g., the Internet gateway 134 of FIG. 1) that can be contained in the control plane VCN 316, and the app subnet(s) 326 can be communicatively coupled to the DB subnet(s) 330 contained in the control plane data tier 328 and to a service gateway 336 (e.g., the service gateway of FIG. 1) and a network address translation (NAT) gateway 338 (e.g., the NAT gateway 138 of FIG. 1). The control plane VCN 316 can include the service gateway 336 and the NAT gateway 338.

The data plane VCN 318 can include a data plane app tier 346 (e.g., the data plane app tier 146 of FIG. 1), a data plane DMZ tier 348 (e.g., the data plane DMZ tier 148 of FIG. 1), and a data plane data tier 350 (e.g., the data plane data tier 150 of FIG. 1). The data plane DMZ tier 348 can include LB subnet(s) 322 that can be communicatively coupled to trusted app subnet(s) 360 and untrusted app subnet(s) 362 of the data plane app tier 346 and the Internet gateway 334 contained in the data plane VCN 318. The trusted app subnet(s) 360 can be communicatively coupled to the service gateway 336 contained in the data plane VCN 318, the NAT gateway 338 contained in the data plane VCN 318, and DB subnet(s) 330 contained in the data plane data tier 350. The untrusted app subnet(s) 362 can be communicatively coupled to the service gateway 336 contained in the data plane VCN 318 and DB subnet(s) 330 contained in the data plane data tier 350. The data plane data tier 350 can include DB subnet(s) 330 that can be communicatively coupled to the service gateway 336 contained in the data plane VCN 318.

The untrusted app subnet(s) 362 can include one or more primary VNICs 364(1)-(N) that can be communicatively coupled to tenant virtual machines (VMs) 366(1)-(N). Each tenant VM 366(1)-(N) can be communicatively coupled to a respective app subnet 367(1)-(N) that can be contained in respective container egress VCNs 368(1)-(N) that can be contained in respective customer tenancies 380(1)-(N). Respective secondary VNICs 372(1)-(N) can facilitate communication between the untrusted app subnet(s) 362 contained in the data plane VCN 318 and the app subnet contained in the container egress VCNs 368(1)-(N). Each container egress VCNs 368(1)-(N) can include a NAT gateway 338 that can be communicatively coupled to public Internet 354 (e.g., public Internet 154 of FIG. 1).

The Internet gateway 334 contained in the control plane VCN 316 and contained in the data plane VCN 318 can be communicatively coupled to a metadata management service 352 (e.g., the metadata management service 152 of FIG. 1) that can be communicatively coupled to public Internet 354. Public Internet 354 can be communicatively coupled to the NAT gateway 338 contained in the control plane VCN 316 and contained in the data plane VCN 318. The service gateway 336 contained in the control plane VCN 316 and contained in the data plane VCN 318 can be communicatively couple to cloud services 356.

In some embodiments, the data plane VCN 318 can be integrated with customer tenancies 380. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 346. Code to run the function may be executed in the VMs 366(1)-(N), and the code may not be configured to run anywhere else on the data plane VCN 318. Each VM 366(1)-(N) may be connected to one customer tenancy 380. Respective containers 381(1)-(N) contained in the VMs 366(1)-(N) may be configured to run the code. In this case, there can be a dual isolation (e.g., the containers 381(1)-(N) running code, where the containers 381(1)-(N) may be contained in at least the VM 366(1)-(N) that are contained in the untrusted app subnet(s) 362), which may help prevent incorrect or otherwise undesirable code from damaging the network of the IaaS provider or from damaging a network of a different customer. The containers 381(1)-(N) may be communicatively coupled to the customer tenancy 380 and may be configured to transmit or receive data from the customer tenancy 380. The containers 381(1)-(N) may not be configured to transmit or receive data from any other entity in the data plane VCN 318. Upon completion of running the code, the IaaS provider may kill or otherwise dispose of the containers 381(1)-(N).

In some embodiments, the trusted app subnet(s) 360 may run code that may be owned or operated by the IaaS provider. In this embodiment, the trusted app subnet(s) 360 may be communicatively coupled to the DB subnet(s) 330 and be configured to execute CRUD operations in the DB subnet(s) 330. The untrusted app subnet(s) 362 may be communicatively coupled to the DB subnet(s) 330, but in this embodiment, the untrusted app subnet(s) may be configured to execute read operations in the DB subnet(s) 330. The containers 381(1)-(N) that can be contained in the VM 366(1)-(N) of each customer and that may run code from the customer may not be communicatively coupled with the DB subnet(s) 330.

In other embodiments, the control plane VCN 316 and the data plane VCN 318 may not be directly communicatively coupled. In this embodiment, there may be no direct communication between the control plane VCN 316 and the data plane VCN 318. However, communication can occur indirectly through at least one method. An LPG 310 may be established by the IaaS provider that can facilitate communication between the control plane VCN 316 and the data plane VCN 318. In another example, the control plane VCN 316 or the data plane VCN 318 can make a call to cloud services 356 via the service gateway 336. For example, a call to cloud services 356 from the control plane VCN 316 can include a request for a service that can communicate with the data plane VCN 318.

Figure 4:
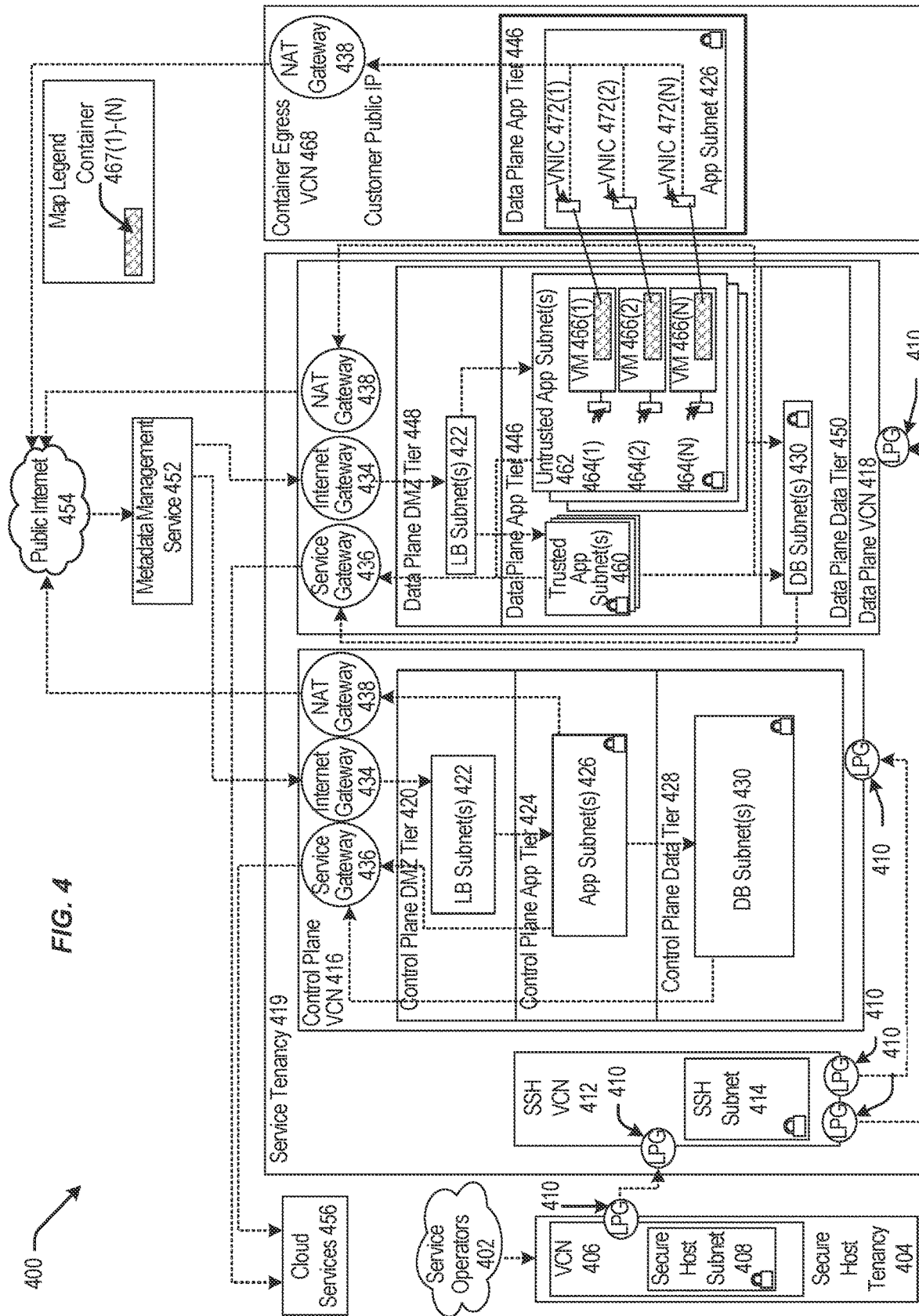

FIG. 4 is a block diagram illustrating another example pattern of an IaaS architecture 400, according to at least one embodiment. Service operators 402 (e.g., service operators 102 of FIG. 1) can be communicatively coupled to a secure host tenancy 404 (e.g., the secure host tenancy 104 of FIG. 1) that can include a virtual cloud network (VCN) 406 (e.g., the VCN 106 of FIG. 1) and a secure host subnet 408 (e.g., the secure host subnet 108 of FIG. 1). The VCN 406 can include an LPG 410 (e.g., the LPG 110 of FIG. 1) that can be communicatively coupled to an SSH VCN 412 (e.g., the SSH VCN 112 of FIG. 1) via an LPG 410 contained in the SSH VCN 412. The SSH VCN 412 can include an SSH subnet 414 (e.g., the SSH subnet 114 of FIG. 1), and the SSH VCN 412 can be communicatively coupled to a control plane VCN 416 (e.g., the control plane VCN 116 of FIG. 1) via an LPG 410 contained in the control plane VCN 416 and to a data plane VCN 418 (e.g., the data plane VCN 118 of FIG. 1) via an LPG 410 contained in the data plane VCN 418. The control plane VCN 416 and the data plane VCN 418 can be contained in a service tenancy 419 (e.g., the service tenancy 119 of FIG. 1).

The control plane VCN 416 can include a control plane DMZ tier 420 (e.g., the control plane DMZ tier 120 of FIG. 1) that can include LB subnet(s) 422 (e.g., LB subnet(s) 122 of FIG. 1), a control plane app tier 424 (e.g., the control plane app tier 124 of FIG. 1) that can include app subnet(s) 426 (e.g., app subnet(s) 126 of FIG. 1), a control plane data tier 428 (e.g., the control plane data tier 128 of FIG. 1) that can include DB subnet(s) 430 (e.g., DB subnet(s) 330 of FIG. 3). The LB subnet(s) 422 contained in the control plane DMZ tier 420 can be communicatively coupled to the app subnet(s) 426 contained in the control plane app tier 424 and to an Internet gateway 434 (e.g., the Internet gateway 134 of FIG. 1) that can be contained in the control plane VCN 416, and the app subnet(s) 426 can be communicatively coupled to the DB subnet(s) 430 contained in the control plane data tier 428 and to a service gateway 436 (e.g., the service gateway of FIG. 1) and a network address translation (NAT) gateway 438 (e.g., the NAT gateway 138 of FIG. 1). The control plane VCN 416 can include the service gateway 436 and the NAT gateway 438.

The data plane VCN 418 can include a data plane app tier 446 (e.g., the data plane app tier 146 of FIG. 1), a data plane DMZ tier 448 (e.g., the data plane DMZ tier 148 of FIG. 1), and a data plane data tier 450 (e.g., the data plane data tier 150 of FIG. 1). The data plane DMZ tier 448 can include LB subnet(s) 422 that can be communicatively coupled to trusted app subnet(s) 460 (e.g., trusted app subnet(s) 360 of FIG. 3) and untrusted app subnet(s) 462 (e.g., untrusted app subnet(s) 362 of FIG. 3) of the data plane app tier 446 and the Internet gateway 434 contained in the data plane VCN 418. The trusted app subnet(s) 460 can be communicatively coupled to the service gateway 436 contained in the data plane VCN 418, the NAT gateway 438 contained in the data plane VCN 418, and DB subnet(s) 430 contained in the data plane data tier 450. The untrusted app subnet(s) 462 can be communicatively coupled to the service gateway 436 contained in the data plane VCN 418 and DB subnet(s) 430 contained in the data plane data tier 450. The data plane data tier 450 can include DB subnet(s) 430 that can be communicatively coupled to the service gateway 436 contained in the data plane VCN 418.

The untrusted app subnet(s) 462 can include primary VNICs 464(1)-(N) that can be communicatively coupled to tenant virtual machines (VMs) 466(1)-(N) residing within the untrusted app subnet(s) 462. Each tenant VM 466(1)-(N) can run code in a respective container 467(1)-(N), and be communicatively coupled to an app subnet 426 that can be contained in a data plane app tier 446 that can be contained in a container egress VCN 468. Respective secondary VNICs 472(1)-(N) can facilitate communication between the untrusted app subnet(s) 462 contained in the data plane VCN 418 and the app subnet contained in the container egress VCN 468. The container egress VCN can include a NAT gateway 438 that can be communicatively coupled to public Internet 454 (e.g., public Internet 154 of FIG. 1).

The Internet gateway 434 contained in the control plane VCN 416 and contained in the data plane VCN 418 can be communicatively coupled to a metadata management service 452 (e.g., the metadata management service 152 of FIG. 1) that can be communicatively coupled to public Internet 454. Public Internet 454 can be communicatively coupled to the NAT gateway 438 contained in the control plane VCN 416 and contained in the data plane VCN 418. The service gateway 436 contained in the control plane VCN 416 and contained in the data plane VCN 418 can be communicatively couple to cloud services 456.

In some examples, the pattern illustrated by the architecture of block diagram 400 of FIG. 4 may be considered an exception to the pattern illustrated by the architecture of block diagram 300 of FIG. 3 and may be desirable for a customer of the IaaS provider if the IaaS provider cannot directly communicate with the customer (e.g., a disconnected region). The respective containers 467(1)-(N) that are contained in the VMs 466(1)-(N) for each customer can be accessed in real-time by the customer. The containers 467(1)-(N) may be configured to make calls to respective secondary VNICs 472(1)-(N) contained in app subnet(s) 426 of the data plane app tier 446 that can be contained in the container egress VCN 468. The secondary VNICs 472(1)-(N) can transmit the calls to the NAT gateway 438 that may transmit the calls to public Internet 454. In this example, the containers 467(1)-(N) that can be accessed in real-time by the customer can be isolated from the control plane VCN 416 and can be isolated from other entities contained in the data plane VCN 418. The containers 467(1)-(N) may also be isolated from resources from other customers.

In other examples, the customer can use the containers 467(1)-(N) to call cloud services 456. In this example, the customer may run code in the containers 467(1)-(N) that requests a service from cloud services 456. The containers 467(1)-(N) can transmit this request to the secondary VNICs 472(1)-(N) that can transmit the request to the NAT gateway that can transmit the request to public Internet 454. Public Internet 454 can transmit the request to LB subnet(s) 422 contained in the control plane VCN 416 via the Internet gateway 434. In response to determining the request is valid, the LB subnet(s) can transmit the request to app subnet(s) 426 that can transmit the request to cloud services 456 via the service gateway 436.

It should be appreciated that IaaS architectures 100, 200, 300, 400 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

3. Computer System

Figure 5:
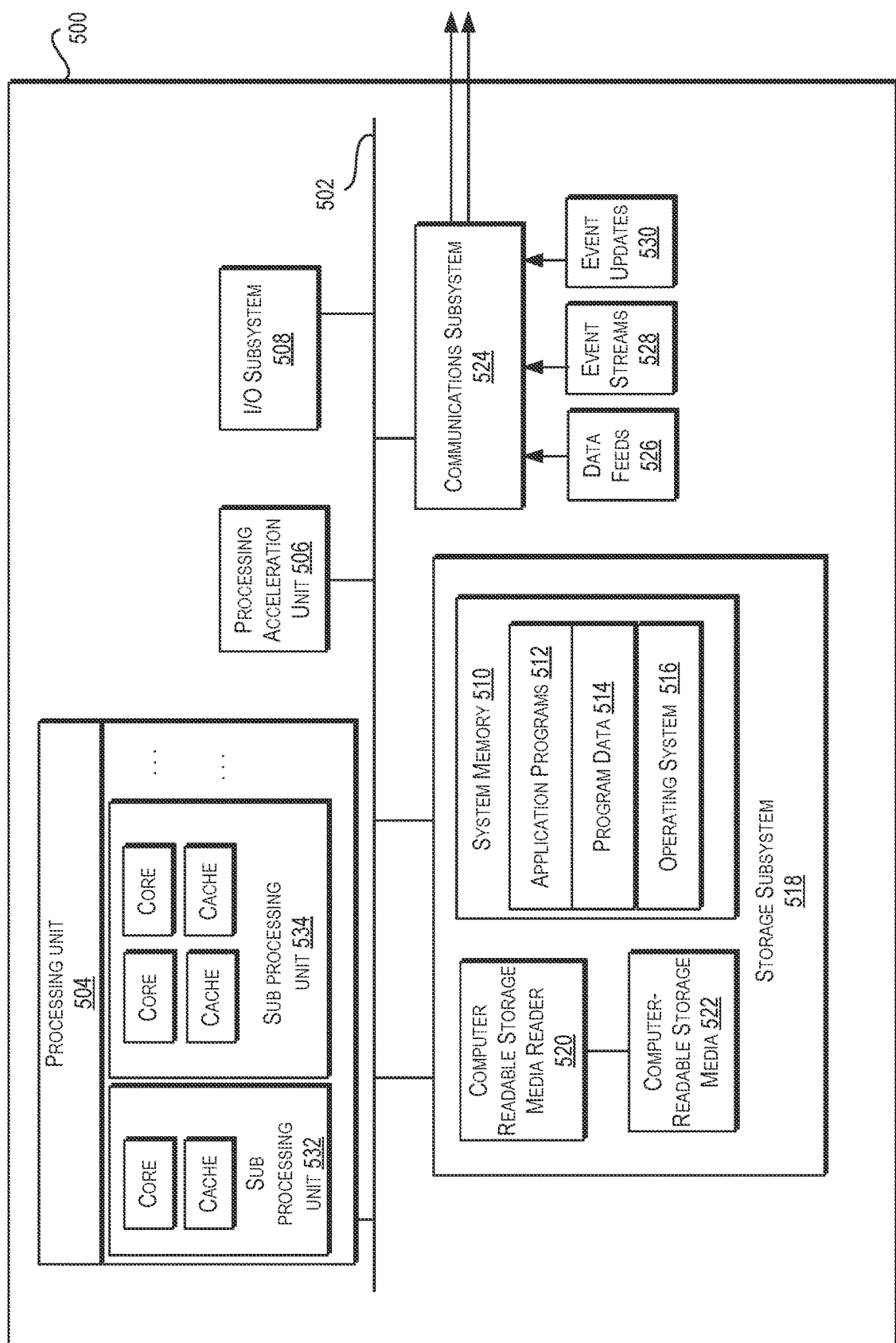
FIG. 5 is a hardware system in accordance with one or more embodiments.

FIG. 5 illustrates an example computer system 500, in which various embodiments may be implemented. The system 500 may be used to implement any of the computer systems described above. As shown in FIG. 5, computer system 500 includes a processing unit 504 that communicates with a number of peripheral subsystems via a bus subsystem 502. These peripheral subsystems may include a processing acceleration unit 506, an I/O subsystem 508, a storage subsystem 518 and a communications subsystem 524. Storage subsystem 518 includes tangible computer-readable storage media 522 and a system memory 510.

Bus subsystem 502 provides a mechanism for letting the various components and subsystems of computer system 500 communicate with each other as intended. Although bus subsystem 502 is shown schematically as a single bus, alternative embodiments of the bus subsystem may utilize multiple buses. Bus subsystem 502 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 504, which can be implemented as one or more integrated circuits (e.g., a conventional microprocessor or microcontroller), controls the operation of computer system 500. One or more processors may be included in processing unit 504. These processors may include single core or multicore processors. In certain embodiments, processing unit 504 may be implemented as one or more independent processing units 532 and/or 534 with single or multicore processors included in each processing unit. In other embodiments, processing unit 504 may also be implemented as a quad-core processing unit formed by integrating two dual-core processors into a single chip.

In various embodiments, processing unit 504 can execute a variety of programs in response to program code and can maintain multiple concurrently executing programs or processes. At any given time, some or all of the program code to be executed can be resident in processing unit 504 and/or in storage subsystem 518. Through suitable programming, processing unit 504 can provide various functionalities described above. Computer system 500 may additionally include a processing acceleration unit 506, which can include a digital signal processor (DSP), a special-purpose processor, and/or the like.

I/O subsystem 508 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 500 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 500 may comprise a storage subsystem 518 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 504 provide the functionality described above. Storage subsystem 518 may also provide a repository for storing data used in accordance with the present disclosure.

As depicted in the example in FIG. 5, storage subsystem 518 can include various components including a system memory 510, computer-readable storage media 522, and a computer readable storage media reader 520. System memory 510 may store program instructions, such as application programs 512, that are loadable and executable by processing unit 504. System memory 510 may also store data, such as program data 514, that is used during the execution of the instructions and/or data that is generated during the execution of the program instructions. Various different kinds of programs may be loaded into system memory 510 including but not limited to client applications, Web browsers, mid-tier applications, relational database management systems (RDBMS), virtual machines, containers, etc.

System memory 510 may also store an operating system 516. Examples of operating system 516 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 500 executes one or more virtual machines, the virtual machines along with their guest operating systems (GOSs) may be loaded into system memory 510 and executed by one or more processors or cores of processing unit 504.

System memory 510 can come in different configurations depending upon the type of computer system 500. For example, system memory 510 may be volatile memory (such as random access memory (RAM)) and/or non-volatile memory (such as read-only memory (ROM), flash memory, etc.) Different types of RAM configurations may be provided including a static random access memory (SRAM), a dynamic random access memory (DRAM), and others. In some implementations, system memory 510 may include a basic input/output system (BIOS) containing basic routines that help to transfer information between elements within computer system 500, such as during start-up.

Computer-readable storage media 522 may represent remote, local, fixed, and/or removable storage devices plus storage media for temporarily and/or more permanently containing, storing, computer-readable information for use by computer system 500 including instructions executable by processing unit 504 of computer system 500.

Computer-readable storage media 522 can include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 522 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 522 may include, but is not limited to, Zip® drives, flash memory cards, universal serial bus (USB) flash drives, secure digital (SD) cards, DVD disks, digital video tape, and the like. Computer-readable storage media 522 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 500.

Machine-readable instructions executable by one or more processors or cores of processing unit 504 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 524 provides an interface to other computer systems and networks. Communications subsystem 524 serves as an interface for receiving data from and transmitting data to other systems from computer system 500. For example, communications subsystem 524 may enable computer system 500 to connect to one or more devices via the Internet. In some embodiments communications subsystem 524 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 524 can provide wired network connectivity (e.g., Ethernet) in addition to or instead of a wireless interface.

In some embodiments, communications subsystem 524 may also receive input communication in the form of structured and/or unstructured data feeds 526, event streams 528, event updates 530, and the like on behalf of one or more users who may use computer system 500.

By way of example, communications subsystem 524 may be configured to receive data feeds 526 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 524 may also be configured to receive data in the form of continuous data streams, which may include event streams 528 of real-time events and/or event updates 530, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 524 may also be configured to output the structured and/or unstructured data feeds 526, event streams 528, event updates 530, and the like to one or more databases that may be in communication with one or more streaming data source computers coupled to computer system 500.

Computer system 500 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 500 depicted in FIG. 5 is intended only as a specific example. Many other configurations having more or fewer components than the system depicted in FIG. 5 are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

4. Certificate Revocation List Management Architecture

Figure 6:
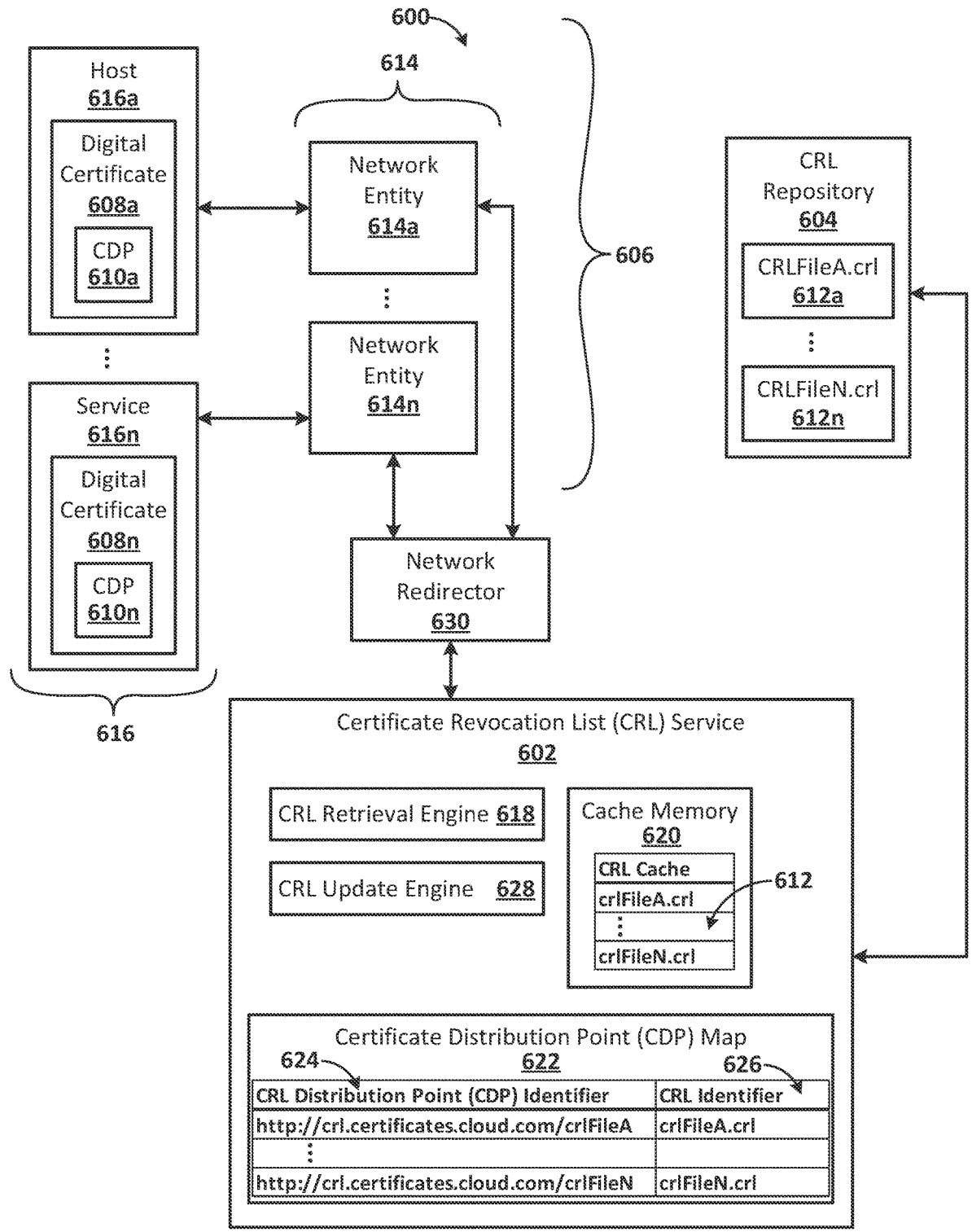
FIG. 6 illustrates features of an example computing network architecture in accordance with one or more embodiments.

Referring now to FIG. 6, an example system 600 is described in accordance with one or more embodiments. The system 600 described with reference to FIG. 6 may perform operations associated with certificate revocation lists services as described herein. As shown in FIG. 6, the system 600 may include a CRL service 602, a CRL repository 604, and a plurality of network entities 606.

Each network entity 606 may include a digital certificate 608, and each digital certificate 608 may include a CDP 610 that identifies a location from which a CRL 612 corresponding to the CA that issued the digital certificate 608 may be located and retrieved. The CDP 610 may include a uniform resource identifier, such as a uniform resource locator, corresponding to a location of the CRL 612 in the CRL repository 604. In one example, the CRL repository 604 may include a plurality of CRLs 612, and the CDPs 610 in the respective digital certificates 608 may respectively identify a location in the CRL repository 604 where a corresponding CRL 612 may be located. The network entities 606 may exchange digital certificates 608 with one another, for example, when establishing a connection with one another in accordance with a security protocol. Network entities 606 may validate one another based at least in part on the digital certificates 608 presented in accordance with the security protocol. As part of the validation process, a network entity 606 may retrieve a CRL 612 corresponding to the CDP 610 identified in a digital certificate 608 presented by another network entity 606 and determine whether the digital certificate 608 is identified in the CRL 612 as having been revoked. In one example, a network entity 606 cannot be validated in accordance with a security protocol when the network entity 606 presents a digital certificate 608 that is identified in a CRL 612 as having been revoked.

A first set of one or more network entities 614 may respectively receive a digital certificate 608 from one or more of a second set of network entities 616. For example, network entity 614a may receive a digital certificate 608a from network entity 616a in accordance with a security protocol. Network entity 614a may transmit a request for a CRL 612 corresponding to the CDP 610a identified in digital certificate 608a. The request for the CRL 612 may be transmitted to the CRL service 602. Additionally, or in the alternative, the request may be transmitted to the CRL repository 604 and intercepted by the CRL service 602. The CRL service 602 may determine that CRL 612a corresponds to CDP 610a. The CRL service 602 may retrieve CRL 612a and transmit CRL 612a to network entity 614a. Network entity 614a may determine whether the digital certificate 608a is identified in CRL 612a, for example, as having been revoked by the CA that issued digital certificate 608a. In one example, network entity 614a may determine that CRL 612a identifies digital certificate 608a as having been revoked. Network entity 614a may determine that network entity 616a is unauthenticated based at least in part on digital certificate 608a being identified in CRL 612a as having been revoked. Network entity 614a may decline to establish a connection with network entity 616a based at least in part on digital certificate 608a being identified in CRL 612a as having been revoked.

Additionally, or in the alternative, network entity 614n may receive a digital certificate 608n from network entity 616n in accordance with a security protocol. Network entity 614n may transmit a request for a CRL 612 corresponding to the CDP 610n identified in digital certificate 608n. The request for the CRL 612 may be transmitted to the CRL service 602. Additionally, or in the alternative, the request may be transmitted to the CRL repository 604 and intercepted by the CRL service 602. The CRL service 602 may determine that CRL 612n corresponds to CDP 610n. The CRL service 602 may retrieve CRL 612n and transmit CRL 612n to network entity 614n. Network entity 614n may determine whether the digital certificate 608n is identified in CRL 612n, for example, as having been revoked by the CA that issued digital certificate 608n. In one example, network entity 614n may determine that digital certificate 608n is not identified in CRL 612n as having been revoked. Network entity 614n may determine that network entity 616n is authenticated based at least in part on a determination that digital certificate 608n is unrevoked. Network entity 614n may determine that digital certificate 608n is unrevoked based at least in part on digital certificate 608n not being identified in CRL 612n as having been revoked. Network entity 614n may proceed to establish a connection with network entity 616n based at least in part on digital certificate 608n having been determined to be unrevoked.

Referring further to the CRL service 602, in one example, the CRL service 602 may include a CRL retrieval engine 618. The CRL retrieval engine may perform operations associated with receiving requests for CRLs from network entities 606, retrieving CRLs, for example, from the CRL repository 604, and transmitting the CRLs to the requesting network entity 606. The CRL service 602 may receive requests for CRLs 612 from network entities 606. In response to a request for a CRL 612, the CRL service 602, such as the CRL retrieval engine 618, may identify a CDP 610 included in the request for the CRL. The CRL service 602, such as the CRL retrieval engine 618, may retrieve a CRL 612 corresponding to the CDP 610, for example, from the CRL repository 604, and transmit the CRL 612 to the network entity 606 that requested the CRL 612.

As shown in FIG. 6, the CRL service 602 may include a cache memory 620. One or more CRLs 612 may be stored in the cache memory 620. In one example, CRLs 612 may be stored in the CRL repository 604, and CRLs 612 that are retrieved from the CRL repository 604 may be stored in the cache memory 620. For example, as shown in FIG. 6, CRL 612a and CRL 612n may be stored in the CRL repository 604. CRL 612a and CRL 612n may be retrieved from the CRL repository 604 and stored in the cache memory 620, for example, in response to a request from a network entity 606.

In one example, in response to a request from a network entity 606 for a CRL 612, the CRL retrieval engine 618 may determine whether the CRL 612 requested by the network entity 606 is stored in the cache memory 620. When the CRL 612 is stored in the cache memory 620, the CRL service 602 may transmit the CRL service 602 from the cache memory 620 to the network entity 606 that requested the CRL 612. When the CRL retrieval engine 618 determines that a CRL 612 requested by a network entity 606 is not stored in the cache memory 620, the CRL retrieval engine 618 may retrieve the CRL 612 from the CRL repository 604. The CRL retrieval engine 618 may store the CRL 612 retrieved from the CRL repository 604 in the cache memory 620 and transmit the CRL 612 to the network entity 606 that requested the CRL 612.

As shown in FIG. 6, the CRL service 602 may include a CDP map 622. The CDP map 622 may include a data structure that associates CDPs 610 with CRLs 612. For example, the data structure of the CDP map 622 may include a set of one or more CDP identifiers 624 respectively corresponding to a CDP 610, and a set of one or more CRL identifiers 626 respectively corresponding to a CRL 612. In one example, each particular CDP identifier 624 may be associated with a particular CRL identifier 626. A CDP identifier 624 may correspond to a location in the CRL repository 604 from which a corresponding CRL 612 may be retrieved. Additionally, or in the alternative, a CDP identifier 624 may correspond to a location in the cache memory 620 from which a corresponding CRL 612 may be retrieved. Additionally, or in the alternative, the CDP map 622 may include an indication as to whether one or more CRLs 612 are stored in the cache memory 620. A CRL identifier 626 may correspond to a file name of a CRL 612.

When the CRL service 602 receives a request for a CRL 612, the CRL service 602, such as the CRL retrieval engine 618, may perform a mapping of the CDP 610 identified in the request to a CRL identifier 626. The CRL identifier 626 corresponding to the CDP 610 may be identified from among a set of available CRL identifiers 626. The CRL service 602, such as the CRL retrieval engine 618, may locate the CRL in the CRL repository 604 and/or the cache memory 620 based on the CRL identifier 626.

In one example, the CDP map 622 may include a hashmap. In one example, the CDP identifier 624 may include a CDP hash value computed by applying a hash function to the CDP. The hashmap may associate particular CRL identifiers 626 with a corresponding CDP hash value. When a CRL 612 is requested by a network entity 606, the CRL service, 602, such as the CRL retrieval engine 618 may apply the hash function to the CDP identified in the CRL request to obtain a request hash value, and the CRL identifier 626 may be identified in the CDP map 622 at least by identifying the CDP hash value corresponding to the request hash value, and then identifying the CRL identifier corresponding to the CDP hash value. The CRL 612 identified by the CRL identifier 626 may be retrieved from the CRL repository 604 and/or the cache memory 620 and transmitted to the network entity 606 that requested the CRL 612.

When the CRL update engine 628 determines that the CRL repository 604 includes a CRL 612 that is not presently stored in the cache memory 620, the CRL update engine 628 may retrieve the CRL 612 from the CRL repository 604 and store the CRL 612 in the cache memory 620. Additionally, or in the alternative, when the CRL update engine 628 determines that the CRL repository 604 includes an updated CRL 612 corresponding to a CRL presently stored in the cache memory 620, the CRL update engine 628 may retrieve the updated CRL and replace the CRL stored in the cache memory 620 with the updated CRL 612 retrieved from the CRL repository. For example, the CRL 612 stored in the cache memory 620 may be deleted and/or overwritten by the updated CRL 612.

In one example, the CRL service 602 may include a CRL update engine 628. The CRL update engine 628 may update a set of one or more CRLs 612 stored in the cache memory 620. In one example, the CRL update engine 628 may periodically query the CRL repository 604 for new and/or updated CRLs 612 stored in the CRL repository 604. Additionally, or in the alternative, the CRL update engine 628 may receive updated CRLs 612 from the CRL repository 604 via a push operation. For example, the push operation may include updated CRLs 612 being transmitted to the CRL update engine 628 and the CRL update engine 628 storing the updated CRL 612 in the cache memory 620. Additionally, or in the alternative, the push operation may include the CRL update engine 628 receiving a push notification that an updated CRL 612 is available in the CRL repository 604. In response to the push notification, the CRL update engine 628 may retrieve the updated CRL 612 from the CRL repository 604 and store the updated CRL in the cache memory 620.

In one example, the CRL service 602 may include a network redirector 630. The network redirector 630 may receive requests for CRLs from the network entities 606 and redirect the requests to the CRL service 602. For example, the network redirector 630 may intercept CRL requests directed to CDPs in the CRL repository 604 and route the CRL requests to the CRL service 602. The CRL service 602 may receive the CRL requests from the network redirector 630 and serve the CRL requests with CRLs stored in the cache memory 620 and/or the CRL repository 604.

The CRL repository 604 and/or the cache memory 620 may include any type of storage unit and/or device (e.g., a file system, database, collection of tables, or any other storage mechanism) for storing data. Further, the CRL repository 604 and/or the cache memory 620 may include multiple different storage units and/or devices. The multiple different storage units and/or devices may or may not be of the same type or located at the same physical site. The CRL repository 604 and/or the cache memory 620 may include one or more storage units. Further, the CRL repository 604 and/or the cache memory 620 may be implemented or executed on the same computing system as the CRL service 602. Additionally, or in the alternative, the CRL repository 604 and/or the cache memory 620 may be implemented or executed on a computing system separate from the CRL service 602. The CRL repository 604 and/or the cache memory 620 may be communicatively coupled to the CRL service 602 via a direct connection or via a network.

In one example, the network entities 606 may be associated with a virtual cloud network. The virtual cloud network may include a substrate network, an overlay network, and a network interface that provides communication between the substrate network and the overlay network. The system 600 may include a plurality of network entities located throughout the virtual cloud network. A network entity 606 may reside on the substrate network, the overlay network, or the network interface. A network entity 606 may be implemented in hardware and/or software in association with the virtual cloud network, such as a node, a host, an agent, a service, a component, an endpoint, or other element. For example, as shown in FIG. 6, network entity 616a may be a host, and network entity 616n may be a service. The plurality of network entities 606 may include one or more substrate entities, one or more interface entities, and/or one or more overlay entities.

As used herein, the term "substrate entity" refers to a network entity 606 implemented in a substrate network. As used herein, the term "substrate network" refers to a physical network infrastructure. The substrate network generally provides a foundation of a virtual cloud network. The substrate network may include physical network devices, such as routers, switches, network links, and other networking components. The substrate network may generally provide the basic connectivity and transport capabilities necessary for data transmission within and between data centers.

The one or more substrate entities may include substrate hosts, routers, firewall appliances, load balancers, storage devices, and/or substrate services. A substrate host may include an endpoint within the substrate network, such as a bare metal host, a virtual machine, a container, or a physical server. A substrate service may include a service executing or executable on a substrate entity, such as a firmware service, a network connectivity service, an addressing service, a name resolution service, a security service, a network monitoring service, a load balancing service, and/or a storage service. A firmware service may be associated with functionality or management of network infrastructure components or services, such as network devices, boot-up or initialization process, hardware controls, feature enablement, updates, hardware abstraction, network configuration, and/or network management. In one example, a substrate entity may include a combination of hardware and software. In one example, the one or more substrate entities may include one or more substrate hosts, and/or one or more substrate services. In one example, a substrate host may include a bare metal host. In one example, a substrate service may include a firmware service. The substrate entities may communicate with one another, and/or with other network entities, using logical network addresses assigned within the overlay network.

As used herein, the term "network interface" refers to a communication interface between a substrate network and an overlay network, such as a network interface card, a smartNIC, or the like. A network interface may include one or more interface entities, such as a node on the network interface, or an interface service executing or executable on the network interface. A node on the network interface may include a programmable hardware component, a memory component, or a gateway component. In one example, a network interface may include a network interface card, such as a smartNIC. Additionally, or in the alternative, a network interface may include a node or an endpoint on a network interface card or smartNIC.

A gateway component may provide connectivity between the substrate network and the network interface, and/or between the network interface and the overlay network. For example, a gateway component may enable communication between overlay entities and substrate entities. Additionally, or in the alternative, a gateway component may provide connectivity between the overlay network and external networks, such as the internet or other networks outside the overlay network. For example, an overlay gateway may enable communication between overlay entities and external endpoints.

As used herein, the term "overlay network" refers to a virtual network built on a substrate network using software-defined networking, virtualization, tunneling, and/or encapsulation technologies. An overlay network generally operates independently of the underlying substrate network. An overlay network may provide logical separation and isolation of traffic, enable virtual network provisioning, and/or allow for implementation of various network services and policies. Virtual machines, hosts, containers, or virtual network functions running on a substrate network may be connected via an overlay network.

As used herein, the term "overlay entity" refers to a network entity implemented on an overlay network. The overlay network may include a plurality of overlay entities. The plurality of overlay entities may include overlay hosts, overlay services, subnets, overlay controllers, and/or overlay clients. In one example, the overlay network may include a plurality of overlay entities. In one example, an overlay entity may include an overlay host. Additionally, or in the alternative, an overlay entity may include an overlay service. The plurality of overlay entities may communicate with one another using logical network addresses assigned within the overlay network.

An overlay host may include an endpoint within the overlay network, such as a virtual machine, a container, or a physical server. An overlay service may include a service executing or executable on an overlay entity. An overlay service may include a client-specific service, such as a service installed by a client. Additionally, or in the alternative, an overlay service may include a virtual network creation service, a virtual network management service, a virtual machine orchestration service, a container orchestration service, a network virtualization service, an overlay security service, a load balancing service, a multi-tenancy service, and/or a tenant isolation service.

A subnet may include a virtual network segment that has a distinct addressing scheme and/or a distinct set of network policies and/or services. A subnet may include a set of overlay hosts. Multiple subnets may be utilized to partition respective sets of overlay hosts. An overlay controller may oversee management, control, provisioning, configuration, and/or monitoring of an overlay network, network entities on the overlay network, and/or network policies within the overlay. An overlay controller interact with the underlying substrate network, for example, to coordinate the operation of overlay hosts and/or communications across virtual switches and tunnels. An overlay client may include an endpoint or device that initiates communication within the overlay network. An overlay client may be a specific instance or role within an overlay host. An overlay host may include a set of overlay clients. An overlay client may include a consumer or user of services provided by overlay hosts or the IaaS. An overlay client may request and consume resources or services from overlay hosts, acting as consumers or clients of those resources or services.

6. Serving Certificate Revocation Lists

Figure 7:
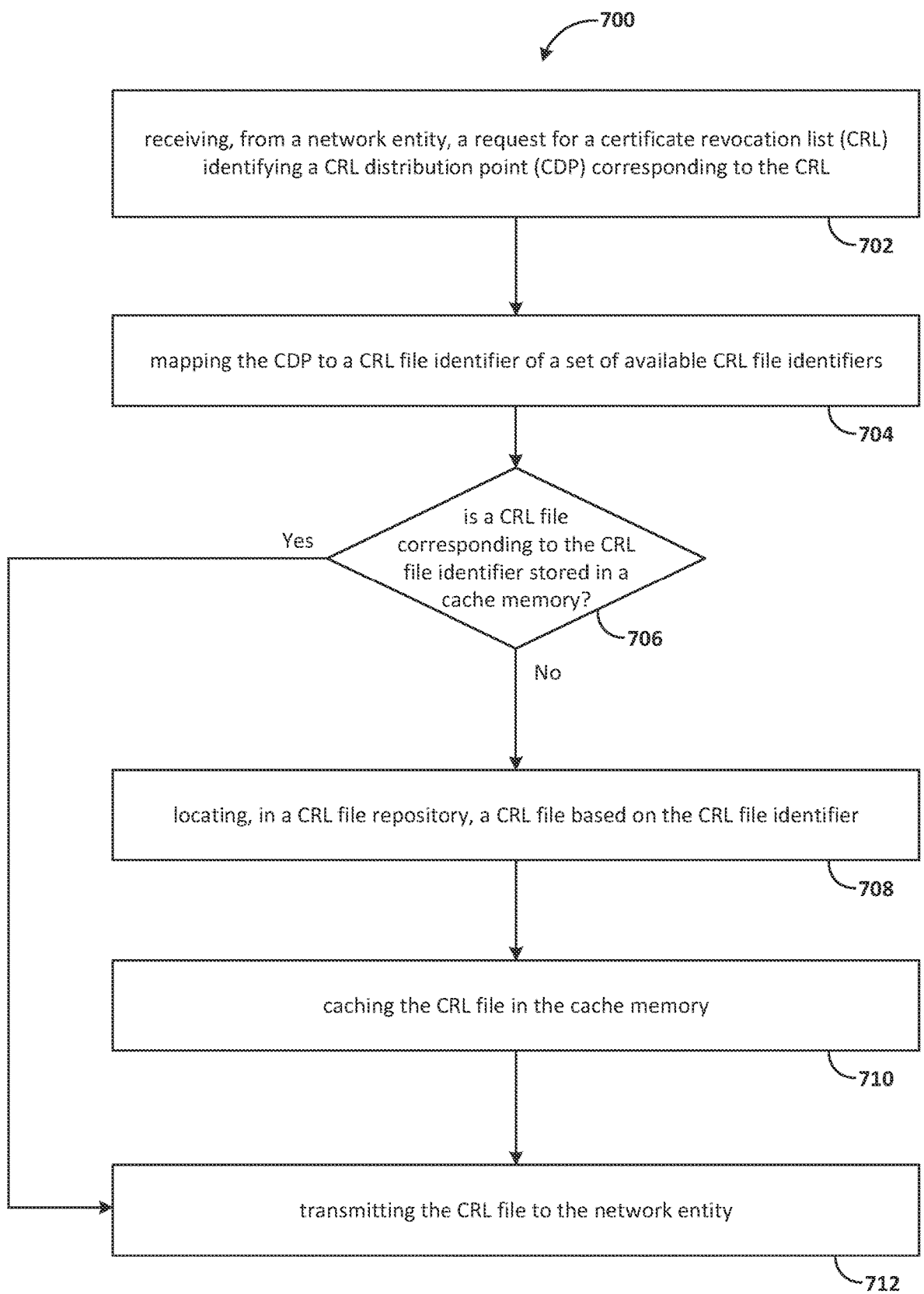
FIG. 7 is a flowchart that illustrates an example operations associated with certificate revocation lists services.

Referring now to FIG. 7, operations 700 operations associated with certificate revocation lists services are further described. The operations 700 described with reference to FIG. 7 may represent at least a portion of a process for authenticating a digital certificate, including, for example, determining whether a digital certificate is identified in a certificate revocation list. One or more operations 700 described with reference to in FIG. 7 may be modified, combined, rearranged, or omitted all together. Accordingly, the particular sequence of operations 700 described with reference to FIG. 7 should not be construed as limiting the scope of one or more embodiments.

As shown in FIG. 7, the operations 700 may include, at block 702, receiving, from a network entity, a request for a CRL identifying a CDP corresponding to the CRL. At block 704, the operations 700 may include mapping the CDP to a CRL identifier. The CRL file identifier may be one of a set of available CRL identifiers. In one example, mapping the CDP to a CRL identifier may include applying a hash function to the CDP to obtain a hash value, and identifying the CRL identifier in a hash map that includes a data structure that associates the CRL identifier with the hash value.

At block 706, the operations 700 may include determining whether a CRL corresponding to the CRL identifier is stored in a cache memory. When the CRL corresponding to the CRL identifier is not located in the cache memory, the operations 700 may proceed to block 708. At block 708, the operations 700 may include locating the CRL in a CRL repository. The CRL may be located in the CRL repository based on the CRL identifier corresponding to the CRL. At block 710, the operations 700 may include caching the CRL in the cache memory. At block 712, the operations 700 may include transmitting the CRL to the network entity. Referring again to block 706, when the CRL is stored in the cache memory, the operations 700 may proceed to block 712, where the CRL may be transmitted to the network entity.

In one example, in response to a first request for a first CRL from a first network entity, the operations 700 may include retrieving the first CRL from the CRL repository, caching the first CRL in the cache memory, and transmitting the first CRL to the first network entity. Subsequently, in response to a second request for the first CRL from a second network entity, the operations 700 may include locating the first CRL in the cache memory, for example, based on the first CRL identifier, and transmitting the first CRL to the second network entity.

In one example, the operations 700 may include receiving a first request for a first CRL from a first network entity, locating the first CRL in the CRL repository, retrieving the first CRL from the CRL repository, caching the first CRL in the cache memory, and transmitting the first CRL to the first network entity. Additionally, or in the alternative, the operations may include receiving a second request for a second CRL from a second network entity, locating the second CRL in the cache memory, and transmitting the second CRL from the cache memory to the second network entity.

In one example, the operations 700 may include determining that an updated CRL is available in the CRL repository, receiving the updated CRL from the CRL repository, and storing the updated first CRL in the cache memory. The updated CRL may supersede or replace a CRL in the cache memory. In one example, determining that the updated CRL is available in the CRL repository may include receiving a notification that the updated CRL is available in the CRL repository. Additionally, or in the alternative, determining that the updated CRL is available in the CRL repository may include querying the CRL repository for the updated CRL. Additionally, or in the alternative, the operations 700 may include receiving an updated CRL via a push operation, and storing the updated CRL in the cache memory. The operations 700 may include deleting a CRL from the cache memory corresponding to the updated CRL, and/or overwriting the CRL with the updated CRL.

7. Authenticating Network Entities

Network entities may utilize CA certificates to authenticate other network entities associated with the virtual cloud network. For example, communications between network entities may be conducted according to a security protocol. The security protocol may include authenticating a network entity based on an entity certificate issued to the network entity by a CA, for example, prior to establishing communications with the network entity.

In one example, the entity certificate and a CA certificate corresponding to the CA that issued the entity certificate may represent at least a portion of a certificate chain. To authenticate the network entity, each signature-key pair in the certificate chain is validated. In one example, a top-level CA may issue the entity certificate, in which case the certificate chain may include one signature-key pair—that is, the digital signature of the top-level CA in the entity certificate, and the public key of the top-level CA. Such a top-level CA is sometimes referred to as a root CA. In another example, the certificate chain may include signature-key pairs corresponding to multiple CA certificates. For example, a root CA may issue an intermediate CA certificate to an intermediate CA, and the intermediate CA may issue the entity certificate to the network entity. In this case, the certificate chain includes two signature-key pairs—that is, (i) the digital signature of the intermediate CA in the entity certificate, and the public key of the intermediate CA; and (ii) the digital signature of the root CA in the intermediate CA certificate, and the public key of the root CA.

As used herein, the term "certificate authority certificate" or "CA certificate" refers to a digital certificate issued by a CA to establish its own identity and authenticity. A certificate authority certificate may be a root CA certificate or an intermediate CA certificate. A certificate authority certificate may be used to sign and issue other digital certificates, including those used for secure communication between network entities.

As used herein, the term "certificate authority" or "CA" refers to an entity responsible for issuing and managing digital certificates. The CA verifies the identity of network entities and digitally signs their certificates to attest to their authenticity.

As used herein, the term "root certificate authority certificate" or "root CA certificate" refers to a top-level CA certificate in a certificate chain or hierarchy. A root CA certificate may be self-issued and/or self-signed by a root CA. As used herein, the term "root CA" refers to a top-level CA in a CA hierarchy. A root CA may issue root CA certificates, intermediate CA certificates, or entity certificates.

As used herein, the term "intermediate certificate authority certificate" or "intermediate CA certificate" refers to an intermediate-level CA certificate in a certificate chain or hierarchy. An intermediate CA certificate may be issued by a root CA. An intermediate CA certificate is located between a root CA certificate and an entity certificate in a certificate chain or hierarchy. As used herein, the term "intermediate CA" refers to an intermediate-level CA in a CA hierarchy. An intermediate CA may issue entity certificates, for example, pursuant to authority granted to an intermediate CA according to a root CA.

As used herein, the term "entity certificate" refers to a digital certificate issued to an entity, such as a network entity associated with a virtual cloud network. An entity certificate may be used to verify the identity of the entity and enable secure communication between entities, such as between network entities in a virtual cloud network. An entity certificate may be issued by a CA, such as root CA or an intermediate CA.

As used herein, the term "digital certificate" refers to a digitally signed electronic document that binds a public key to the identity of an entity. A digital certificate may conform to International Telecommunication Union standard X.509. A digital certificate may include an issuer's name, a certificate holder's name, a public key, issuer (CA) information, an expiration date, and/or a CDP corresponding to a CRL. Digital certificates may be used in various security protocols, such as SSL/TLS, to establish the identity and authenticity of the communicating parties and facilitate secure communication.

8. Miscellaneous; Extensions

Embodiments are directed to a system with one or more devices that include a hardware processor and that are configured to perform any of the operations described herein and/or recited in any of the claims below. Embodiments are directed to a system including means to perform any of the operations described herein and/or recited in any of the claims below. In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

All references, including publications, patent applications, and patents, cited herein are hereby incorporated by reference to the same extent as if each reference were individually and specifically indicated to be incorporated by reference and were set forth in its entirety herein.

What is claimed is:

1. One or more non-transitory computer readable media comprising instructions which, when executed by one or more hardware processors, causes performance of operations comprising:
receiving, from a first network entity, a first request for a first certificate revocation list (CRL), the first CRL identifying a first CRL distribution point (CDP) corresponding to the first CRL;
mapping the first CDP to a first CRL identifier of a set of available CRL identifiers;
locating, in a CRL repository, a first CRL based on the first CRL identifier; and
transmitting the first CRL to the first network entity.

2. The media of claim 1, wherein mapping the first CDP to the first CRL identifier comprises:
applying a hash function to the first CDP to obtain a first hash value; and
identifying, in a hash map, the first CRL identifier, wherein the hash map comprises a data structure that associates the first CRL identifier with the first hash value.

3. The media of claim 1, wherein the first CDP comprises a first uniform resource identifier corresponding to a first location of the first CRL in the CRL repository.

4. The media of claim 1, wherein the operations further comprise:
caching the first CRL in a cache memory;
receiving, from a second network entity, a second request for the first CRL, the second CRL identifying the first CDP corresponding to the CRL;
mapping the first CDP to the first CRL identifier of the set of available CRL identifiers;
locating, in the cache memory, the first CRL based on the first CRL identifier;
transmitting the first CRL to the second network entity.

5. The media of claim 1, wherein the operations further comprise:
receiving, from a second network entity, a second request for a second CRL, the second CRL identifying a second CDP corresponding to the second CRL;
mapping the second CDP to a second CRL identifier of the set of available CRL identifiers;
locating, in the CRL repository, the second CRL based on the second CRL identifier;
caching the second CRL in a cache memory;
transmitting the second CRL to the second network entity.

6. The media of claim 5, wherein the operations further comprise:
receiving the first request for the first CRL at a CRL service, and transmitting the first CRL from the CRL service to the first network entity at a first uniform resource identifier corresponding to the first network entity;
receiving the second request for the second CRL at the CRL service, and transmitting the second CRL from the CRL service to the second network entity at a second uniform resource identifier corresponding to the second network entity;
wherein the CRL service corresponds to a third uniform resource identifier, wherein the third uniform resource identifier represents an endpoint for receiving CRL requests from a plurality of network entities including the first network entity and the second network entity.

7. The media of claim 6, wherein the third uniform resource identifier is identified in at least one of:
a first digital certificate presented to the first network entity for performing a first one or more validation operations by the first network entity, wherein the first one or more validation operations comprises determining whether the first CRL includes a first identifier indicative of the first digital certificate having been revoked; or
a second digital certificate presented to the second network entity for performing a second one or more validation operations by the second network entity, wherein the second one or more validation operations comprises determining whether the second CRL includes a second identifier indicative of the second digital certificate having been revoked.

8. The media of claim 6, wherein the operations further comprise:
receiving the first request for the first CRL at a network redirector, and redirecting the first request for the first CRL to the CRL service; and
receiving the second request for the second CRL at the network redirector, and redirecting the second request for the second CRL to the CRL service.

9. The media of claim 1, wherein the operations further comprise:
caching the first CRL in a cache memory;
determining that an updated first CRL is available in the CRL repository;
receiving the updated first CRL from the CRL repository;
storing the updated first CRL in the cache memory, wherein the updated first CRL supersedes or replaces the first CRL.

10. The media of claim 9, wherein determining that the updated first CRL is available in the CRL repository comprises at least one of:
receiving a notification that the updated first CRL is available in the CRL repository; or
querying the CRL repository for the updated first CRL.

11. The media of claim 1, wherein the operations further comprise:
caching the first CRL in a cache memory;
receiving, via a push operation, an updated first CRL;
storing the updated first CRL in the cache memory, wherein the first CRL is deleted from the cache memory or overwritten by the updated first CRL.

12. A method, comprising:
receiving, from a first network entity, a first request for a first certificate revocation list (CRL), the first CRL identifying a first CRL distribution point (CDP) corresponding to the first CRL;
mapping the first CDP to a first CRL identifier of a set of available CRL identifiers;
locating, in a CRL repository, a first CRL based on the first CRL identifier; and
transmitting the first CRL to the first network entity;
wherein the method is performed by at least one device including a hardware processor.

13. The method of claim 12, wherein mapping the first CDP to the first CRL identifier comprises:
applying a hash function to the first CDP to obtain a first hash value; and
identifying, in a hash map, the first CRL identifier, wherein the hash map comprises a data structure that associates the first CRL identifier with the first hash value.

14. The method of claim 12, further comprising:
receiving, from a second network entity, a second request for a second CRL, the second CRL identifying a second CDP corresponding to the second CRL;
mapping the second CDP to a second CRL identifier of the set of available CRL identifiers;
locating, in the CRL repository, the second CRL based on the second CRL identifier;
caching the second CRL in a cache memory;
transmitting the second CRL to the second network entity.

15. The method of claim 14, further comprising:
receiving the first request for the first CRL at a CRL service, and transmitting the first CRL from the CRL service to the first network entity at a first uniform resource identifier corresponding to the first network entity;
receiving the second request for the second CRL at the CRL service, and transmitting the second CRL from the CRL service to the second network entity at a second uniform resource identifier corresponding to the second network entity;
wherein the CRL service corresponds to a third uniform resource identifier, wherein the third uniform resource identifier represents an endpoint for receiving CRL requests from a plurality of network entities including the first network entity and the second network entity.

16. The method of claim 15, further comprising:
receiving the first request for the first CRL at a network redirector, and redirecting the first request for the first CRL to the CRL service; and
receiving the second request for the second CRL at the network redirector, and redirecting the second request for the second CRL to the CRL service.

17. The method of claim 12, further comprising:
caching the first CRL in a cache memory;
determining that an updated first CRL is available in the CRL repository;
receiving the updated first CRL from the CRL repository;
storing the updated first CRL in the cache memory, wherein the updated first CRL supersedes or replaces the first CRL.

18. The method of claim 17, wherein determining that the updated first CRL is available in the CRL repository comprises at least one of:
receiving a notification that the updated first CRL is available in the CRL repository; or
querying the CRL repository for the updated first CRL.

19. The method of claim 12, further comprising:
caching the first CRL in a cache memory;
receiving, via a push operation, an updated first CRL;
storing the updated first CRL in the cache memory, wherein the first CRL is deleted from the cache memory or overwritten by the updated first CRL.

20. A system comprising:
at least one hardware processor;
the system being configured to execute operations, using the at least one hardware processor, the operations comprising:
receiving, from a first network entity, a first request for a first certificate revocation list (CRL), the first CRL identifying a first CRL distribution point (CDP) corresponding to the first CRL;
mapping the first CDP to a first CRL identifier of a set of available CRL identifiers;
locating, in a CRL repository, a first CRL based on the first CRL identifier; and
transmitting the first CRL to the first network entity.

* * * * *